US012717073B2

(12) United States Patent
Lee et al.

(10) Patent No.: US 12,717,073 B2
(45) Date of Patent: Aug. 25, 2026

(54) DISPLAY DEVICE

(71) Applicant: Samsung Display Co., Ltd., Yongin-Si (KR)

(72) Inventors: Seon Uk Lee, Seongnam-si (KR); Kanguk Kim, Hwaseong-si (KR); Yeogeon Yoon, Seoul (KR); Donchan Cho, Seongnam-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 620 days.

(21) Appl. No.: 17/496,378

(22) Filed: Oct. 7, 2021

(65) Prior Publication Data

US 2022/0221637 A1 Jul. 14, 2022

(30) Foreign Application Priority Data

Jan. 13, 2021 (KR) ........................ 10-2021-0004602

(51) Int. Cl.
*G02B 5/22* (2006.01)

(52) U.S. Cl.
CPC .......... *G02B 5/22* (2013.01); *G02B 2207/101* (2013.01)

(58) Field of Classification Search
CPC .... G02B 5/22; G02B 2207/101; H10K 59/38; H10K 59/126; H10K 59/35
USPC ................................. 359/891, 892; 349/106
See application file for complete search history.

(56) References Cited

U.S. PATENT DOCUMENTS 6,919,991 B2 * 7/2005 Koyama .......... B29D 11/00365 359/619
7,259,812 B2 * 8/2007 Park ................. G02F 1/134363 349/141
7,474,483 B2 * 1/2009 Cheng .................... G02B 5/201 359/885
9,954,036 B2 * 4/2018 Sato ..................... H10K 59/353
10,861,905 B2 * 12/2020 Wang .................. G09G 3/3225
2006/0152645 A1 7/2006 Song et al.
(Continued)

FOREIGN PATENT DOCUMENTS

CN 111312792 A 6/2020
CN 113272988 A 8/2021
(Continued)

OTHER PUBLICATIONS

Extended European Search Report, Application No. 22151041.5, dated Jun. 13, 2022, 9 pages.

*Primary Examiner* — Audrey Y Chang
(74) *Attorney, Agent, or Firm* — Innovation Counsel LLP

(57) ABSTRACT

A display device includes a first substrate, pixel structures, and first, second, and third optical filters. The first substrate has a plurality of pixel regions each including first, second, and third sub-pixel regions. The pixel structures are disposed on the first substrate. The first, second, and third optical filters are disposed to overlap the first, second, and third sub-pixel regions, respectively, on the pixel structures. Each of the first, second, and third optical filters has a tetragon shape. A long axis of the tetragon is parallel to row or column directions of the pixel regions. The third optical filter overlaps a first virtual line located between a side of the first optical filter and a side of the second optical filter which is adjacent to the side of the first optical filter. The first virtual line extends parallel to the sides of the first and second optical filters.

19 Claims, 28 Drawing Sheets

(56) References Cited

U.S. PATENT DOCUMENTS

| | | | | |
|---|---|---|---|---|
| 2013/0234917 | A1* | 9/2013 | Lee | H10K 59/353 345/82 |
| 2015/0029208 | A1 | 1/2015 | Kim | |
| 2015/0048348 | A1* | 2/2015 | Huang | G02F 1/133512 257/40 |
| 2015/0318447 | A1 | 11/2015 | Choi | |
| 2016/0322433 | A1* | 11/2016 | Kim | H10K 59/352 |
| 2016/0365397 | A1 | 12/2016 | Seo et al. | |
| 2018/0074240 | A1 | 3/2018 | Bonar et al. | |
| 2019/0252470 | A1 | 8/2019 | Lee | |
| 2020/0066803 | A1* | 2/2020 | Kim | G02B 5/22 |
| 2020/0212113 | A1 | 7/2020 | Song et al. | |
| 2020/0217998 | A1 | 7/2020 | Jung et al. | |
| 2021/0397806 | A1 | 12/2021 | Lu et al. | |
| 2022/0077256 | A1 | 3/2022 | Lim et al. | |
| 2022/0115612 | A1 | 4/2022 | Ahn et al. | |

FOREIGN PATENT DOCUMENTS

| | | | |
|---|---|---|---|
| EP | 3678186 | A1 | 7/2020 |
| EP | 3982418 | A1 | 4/2022 |
| KR | 10-2003-0087684 | A | 11/2003 |
| KR | 10-2007-0049172 | A | 5/2007 |
| KR | 10-2007-0072296 | A | 7/2007 |
| KR | 10-2011-0099486 | A | 9/2011 |
| KR | 10-2015-0012542 | | 2/2015 |
| KR | 10-2015-0129551 | A | 11/2015 |
| KR | 10-2016-0017373 | A | 2/2016 |
| KR | 10-2019-0004874 | A | 1/2019 |
| KR | 10-2019-0071075 | A | 6/2019 |
| KR | 10-2019-0095630 | | 8/2019 |
| KR | 10-2020-0135727 | A | 12/2020 |

* cited by examiner 100
410
490
495
497
310
270
190
150
110
I'
I
420
453
452
451
340
450
290_1
290_2
290_3
330
340
200
510
511
512
513
530
531
532
533
a1
b1
c1
290_1
290_2
290_3
330
250_1
250_2
250_3
230_1
230_2
230_3
210_1
210_2
210_3
170_1
170_2
170_3
130_1
130_2
130_3

DISPLAY DEVICE

CROSS-REFERENCE TO RELATED APPLICATION

This application claims priority under 35 § 119 to Korean Patent Application No. 10-2021-0004602 filed on Jan. 13, 2021 in the Korean Intellectual Property Office (KIPO), the entire disclosure of which is incorporated herein by reference.

BACKGROUND

1. Field

Embodiments relate generally to a display device. More particularly, embodiments of the present inventive concept relate to a display device including an optical filter and a color filter.

2. Description of the Related Art

Flat panel display devices are used as display devices for replacing a cathode ray tube display device due to lightweight and thin characteristics of the flat panel display devices. As representative examples of such flat panel display devices, there are a liquid crystal display device and an organic light emitting diode display device.

Recently, a display device including a quantum dot layer, e.g., an optical filter, and a color filter has been developed. The display device may include a first substrate and a second substrate. A sub-pixel structure may be disposed on an upper surface of the first substrate, and a quantum dot layer, a light blocking member surrounding the quantum dot layer, and a color filter may be disposed on a lower surface of the second substrate. For example, the light blocking member having a plurality of openings may be disposed on a lower surface of the color filter, and the quantum dot layers may be disposed in the openings. Here, each of the openings may be a plan shape of a square on a plane surface (or when viewed in a plan), and the quantum dot layer may be formed by an ink-jet method. When the quantum dot layer is formed in the opening having a plan shape of a square by the ink-jet method, a relatively long process time is required to form the quantum dot layer because an impact section of an ink is relatively short.

SUMMARY

Embodiments provide a display device including an optical filter and a color filter.

According to embodiments of the present inventive concept, a display device includes a first substrate, pixel structures, and first, second, and third optical filters. The first substrate has a plurality of pixel regions each including a first sub-pixel region, a second sub-pixel region, and a third sub-pixel region. The pixel structures are disposed on the first substrate. The first, second, and third optical filters are disposed to overlap the first, second, and third sub-pixel regions, respectively, on the pixel structures. Each of the first, second, and third optical filters has a tetragon shape. A long axis of the tetragon is parallel to row or column directions of the pixel regions. The third optical filter overlaps a first virtual line located between a first side of the first optical filter and a first side of the second optical filter, the first side of the second optical filter being adjacent to the first side of the first optical filter. The first virtual line extends parallel to the first sides of the first and second optical filters.

In embodiments, the first optical filter further includes second, third, and fourth sides on a plane of the display device, the second optical filter further includes second, third, and fourth sides on the plane of the display device, and the third optical filter includes first, second, third, and fourth sides on the plane of the display device. The first and second sides of the first optical filter and the first and second sides of the second optical filter may be parallel to each other. A second virtual line may be perpendicular to the first virtual line. The second virtual line may connect points that correspond to half of each of the first and second sides of the first optical filter and the first and second sides of the second optical filter.

In embodiments, the first virtual line may connect points that correspond to half of each of first and second sides of the third optical filter.

In embodiments, a distance of each of sides of the tetragon may be a same on a plane of the display device.

In embodiments, the display device may further include a light blocking member disposed on the pixel structure. The light blocking member may include a first opening overlapping the first sub-pixel region, a second opening overlapping the second sub-pixel region, and a third opening overlapping the third sub-pixel region.

In embodiments, the first optical filter may be disposed in the first opening. The second optical filter may be disposed in the second opening. The third optical filter may be disposed in the third opening.

In embodiments, a shape of the first optical filter may be identical to a shape of the first opening on a plane of the display device. A shape of the second optical filter may be identical to a shape of the second opening on the plane of the display device. A shape of the third optical filter may be identical to a shape of the third opening on the plane of the display device.

In embodiments, the third optical filter may transmit a first color of light. The first optical filter may convert the first color of light to a second color of light. The second optical filter may convert the first color of light to a third color of light.

In embodiments, the pixel structure may emit the first color of light.

In embodiments, the display device may further include a second substrate disposed on the first, second, and third optical filters. A first color filter is disposed between the second substrate and the first optical filter. A second color filter is disposed between the second substrate and the second optical filter. A third color filter is disposed between the second substrate and the third optical filter.

In embodiments, the third color filter may overlap the third optical filter on a lower surface of the second substrate. The third color filter may include a first opening and a second opening. The first opening may overlap a portion where the first optical filter is disposed. The second opening may overlap a portion where the second optical filter is disposed.

In embodiments, the first color filter may be disposed in the first opening of the third color filter. The first color filter may include a third opening and a fourth opening. The third opening may expose the second opening. The fourth opening may overlap a portion where the third optical filter is disposed under the third color filter.

In embodiments, the second color filter may be disposed in the second and third opening. The second color filter may include a fifth opening and a sixth opening. The fifth opening may expose a part of the first color filter. The sixth opening may overlap the fourth opening.

In embodiments, the pixel structure may include a first lower electrode disposed under the first optical filter, a second lower electrode disposed under the second optical filter, a third lower electrode disposed under the third optical filter, a light emitting layer disposed on the first, second, and third lower electrodes, and an upper electrode disposed on the light emitting layer. A shape of each of the first, second, and third lower electrodes may correspond to a shape of each of the first, second, and third optical filters.

According to embodiments of the present inventive concept, a display device includes a first substrate, pixel structures, and first, second, and third optical filters. The first substrate has a plurality of pixel regions each including a first sub-pixel region, a second sub-pixel region, and a third sub-pixel region. Pixel structures are disposed on the first substrate. First, second, and third optical filters are disposed to overlap the first, second, and third sub-pixel regions, respectively, on the pixel structures. Each of the first, second, and third optical filters has a tetragon shape in which each of corners is chamfered. Each of the first, second, and third optical filters is rotated at a predetermined angle based on a center of the tetragon. The third optical filter overlaps a first virtual line located between a first side of the first optical filter and a first side of the second optical filter, the first side of the second optical filter being adjacent to the first side of the first optical filter. The first virtual line extends parallel to the first sides of the first and second optical filters.

In embodiments, an angle between the chamfered corner and a side of the tetragon may be an obtuse angle.

In embodiments, a distance between chamfered corners, which are opposite to each other, among the chamfered corners may be greater than a distance between sides of the tetragon, which are opposite to each other, among the sides of the tetragon.

In embodiments, each of corners of the first, second, and third optical filters may have a rounded tetragon shape.

In embodiments, the predetermined angle may be about 45 degrees, and the chamfered tetragon may be a square.

In embodiments, the display device may further include a light blocking member disposed on the pixel structure. The light blocking member may include a first opening overlapping the first sub-pixel region, a second opening overlapping the second sub-pixel region, and a third opening overlapping the third sub-pixel region. The first optical filter may be disposed in the first opening. The second optical filter may be disposed in the second opening. The third optical filter may be disposed in the third opening. A shape of the first optical filter may be identical to a shape of the first opening on a plane of the display device. A shape of the second optical filter may be identical to a shape of the second opening on the plane of the display device. A shape of the third optical filter may be identical to a shape of the third opening on the plane of the display device.

In the display device according to the embodiments of the present inventive concept, as each of the first to third openings of the light blocking member has a plan shape of a square rotated about 45 degrees, an impact section of an ink may be relatively long. Accordingly, the inkjet process may be simultaneously performed in the mother substrate including the second substrates of different sizes, and a time of the inkjet process may be significantly reduced due to a relatively long impact section of the ink.

In addition, each of the first to third openings has chamfered corners, so that the ink may easily fill the corners. Accordingly, the display device may prevent a defect in which the ink is not filled at the corners.

Further, in an embodiment, since the first to third openings can be configured in a "T" shape rotated by about 45 degrees, the display device may secure a relatively high aperture ratio.

BRIEF DESCRIPTION OF THE DRAWINGS

Embodiments can be understood in more detail from the following description taken in conjunction with the accompanying drawings.

DETAILED DESCRIPTION OF THE EMBODIMENTS

Figure 1:
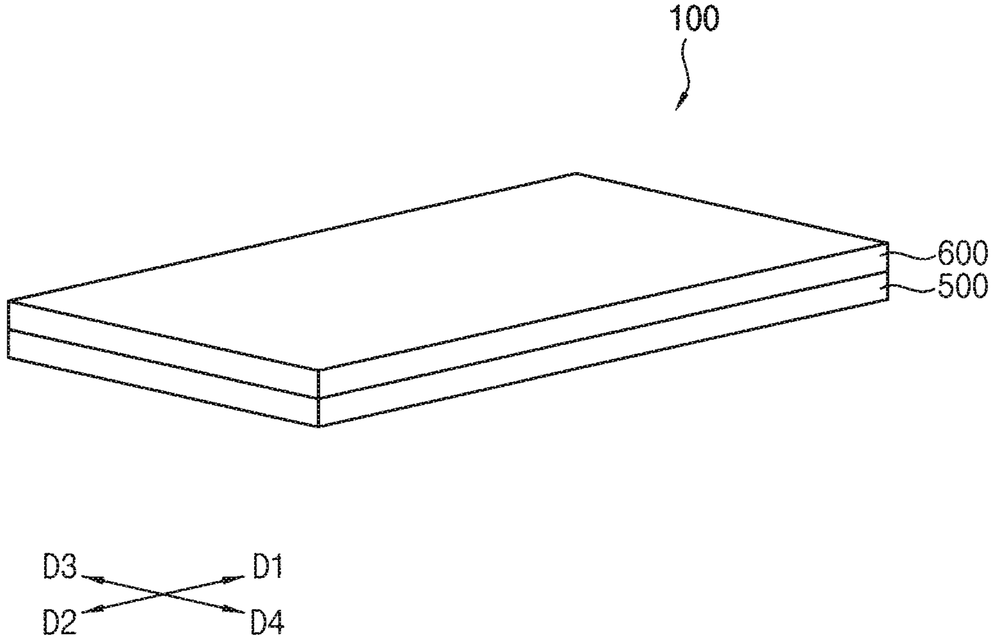
FIG. 1 is a perspective view illustrating a display device according to embodiments of the present inventive concept.

Hereinafter, a display device and a method of manufacturing a display device according to embodiments of the present inventive concept will be described in detail with reference to the accompanying drawings. In the accompanying drawings, same or similar reference numerals refer to the same or similar elements.

Figure 2:
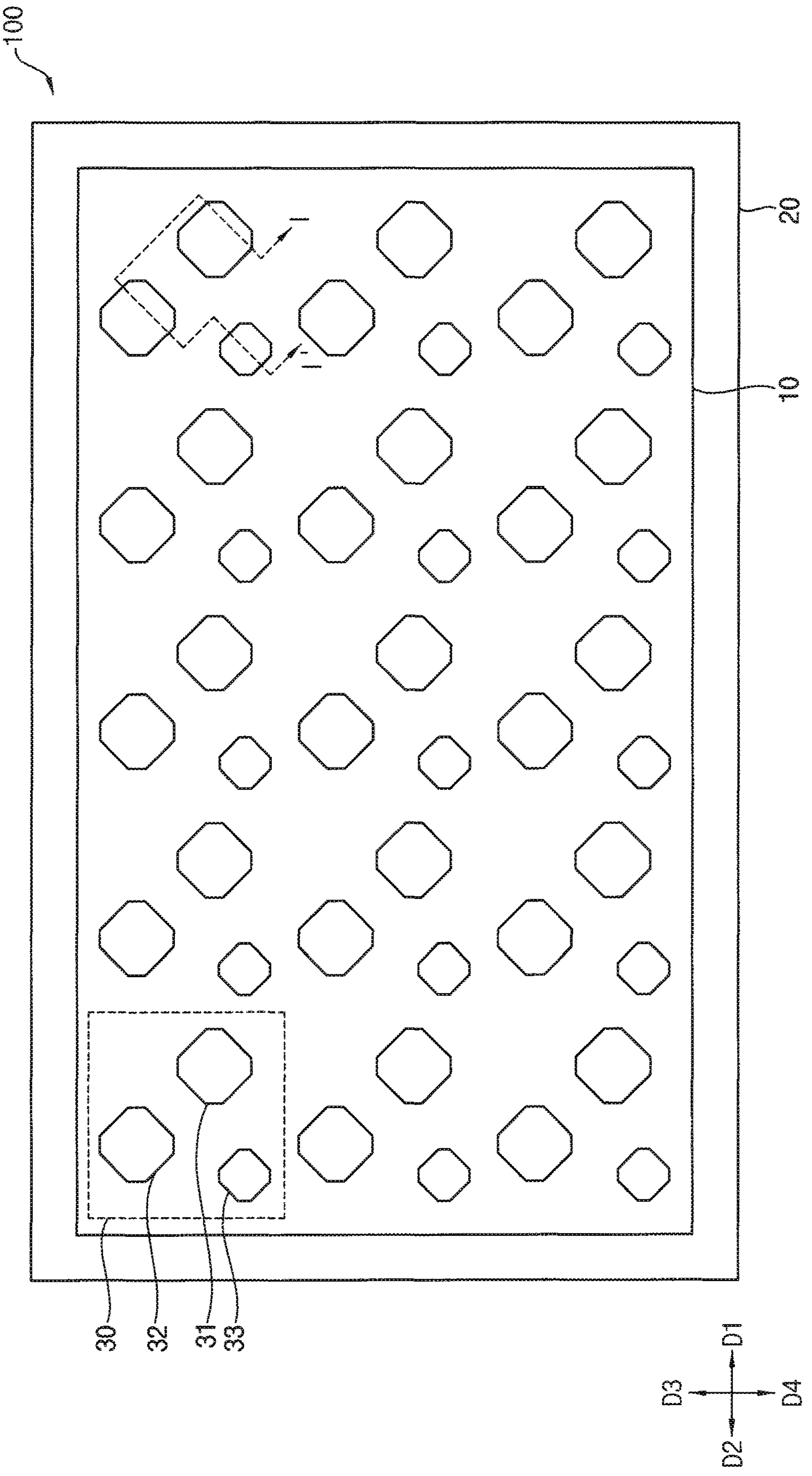
FIG. 2 is a plan view illustrating the display device of FIG. 1.

FIG. 1 is a perspective view illustrating a display device 100 according to embodiments of the present inventive concept. FIG. 2 is a plan view illustrating the display device

Figure 3:
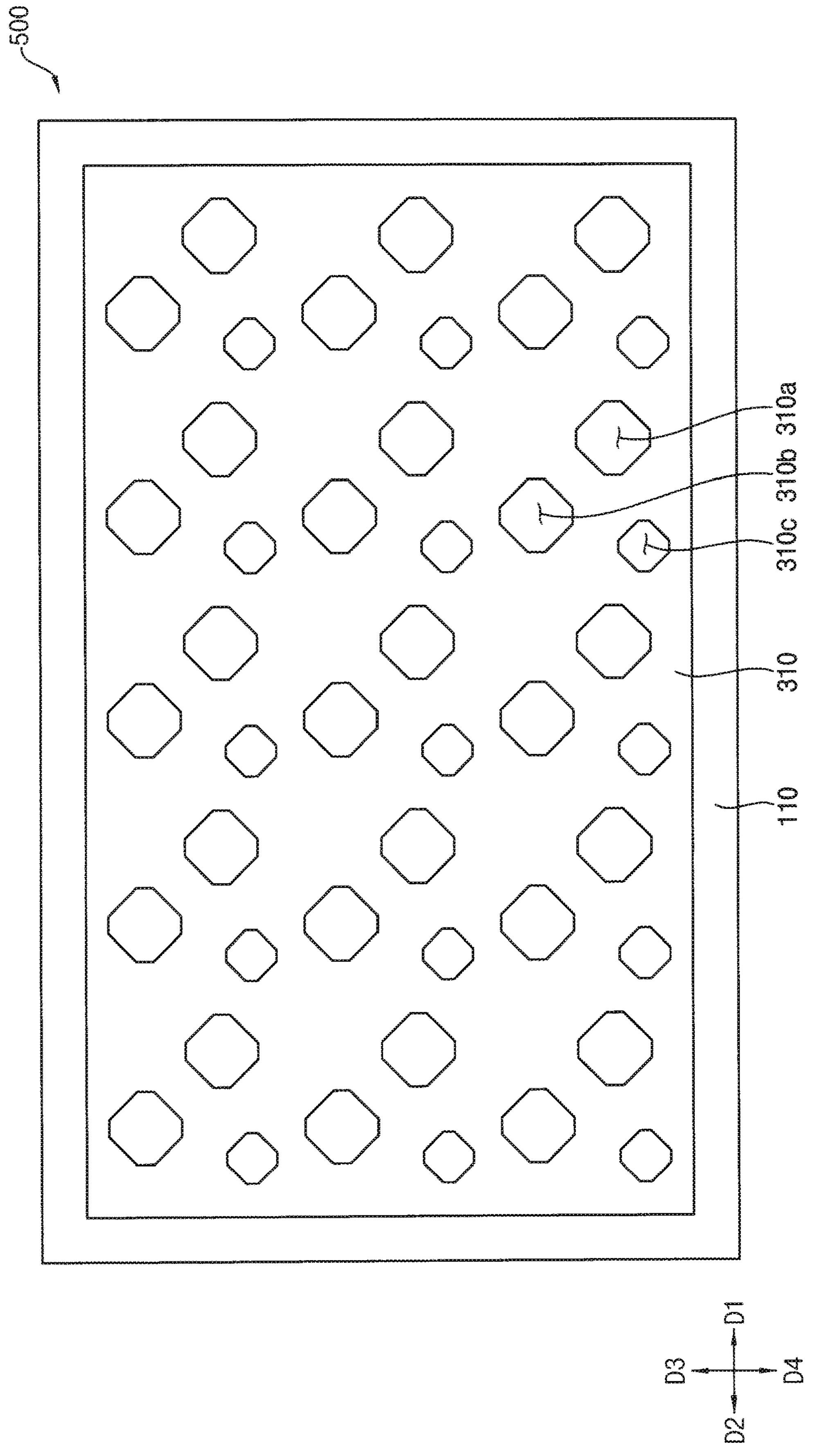
FIG. 3 is a plan view for describing a pixel defining layer included in the display device of FIG. 1.
Figure 4:
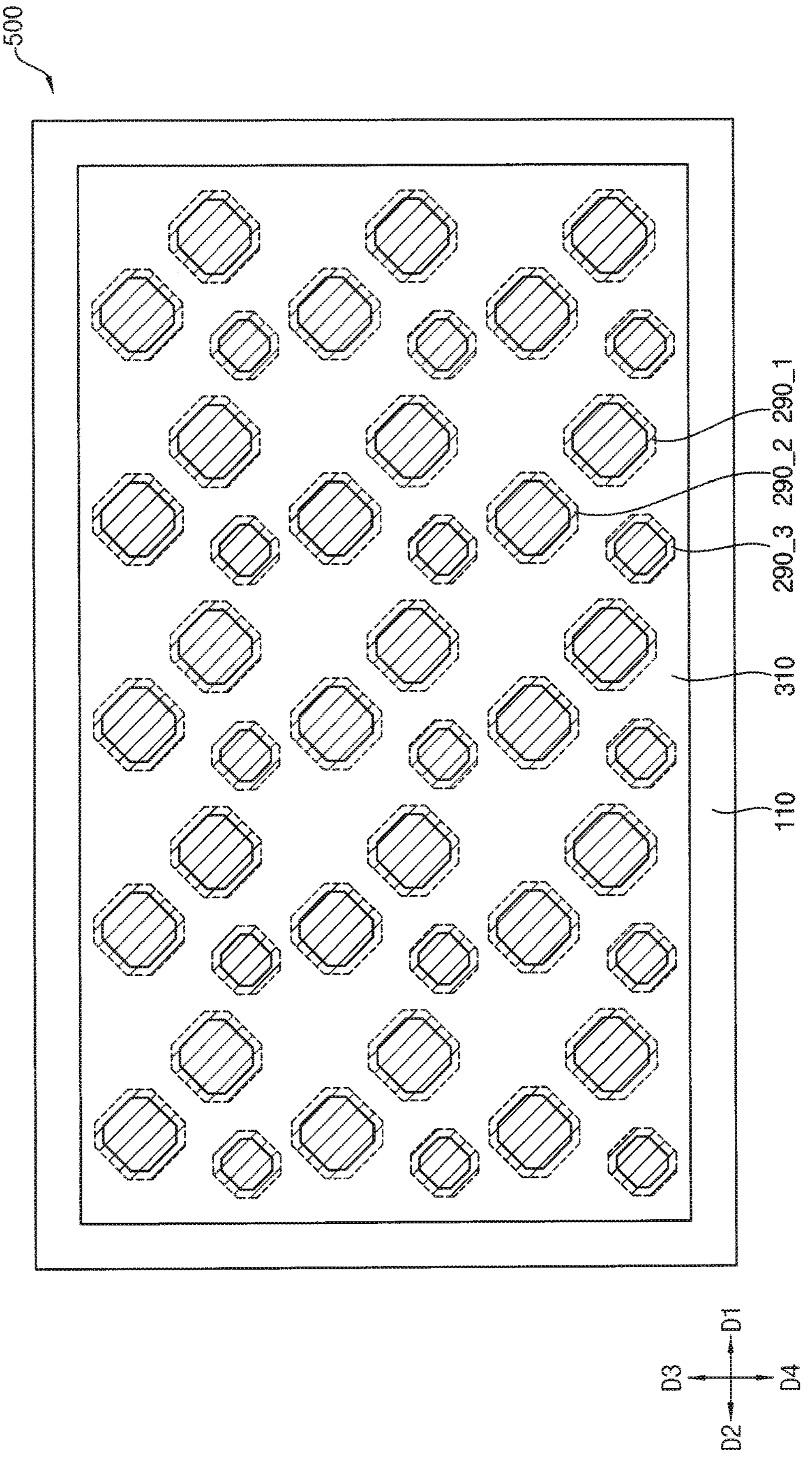
FIG. 4 is a plan view illustrating a state in which the pixel defining layer and a lower electrode included in the display device of FIG. 1 overlap each other.
Figure 5:
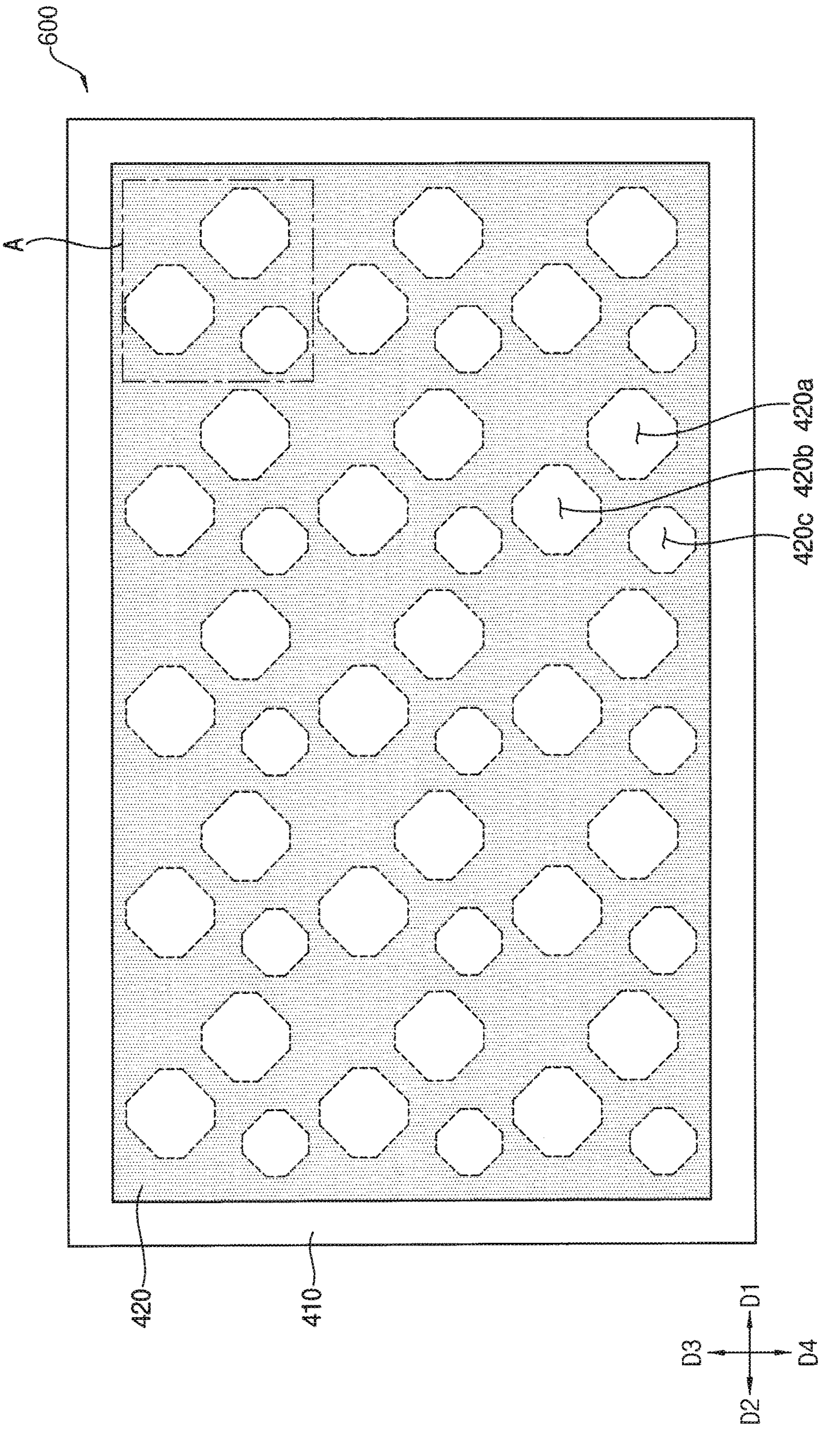
FIG. 5 is a plan view for describing a light blocking member included in the display device of FIG. 1.
Figure 6:
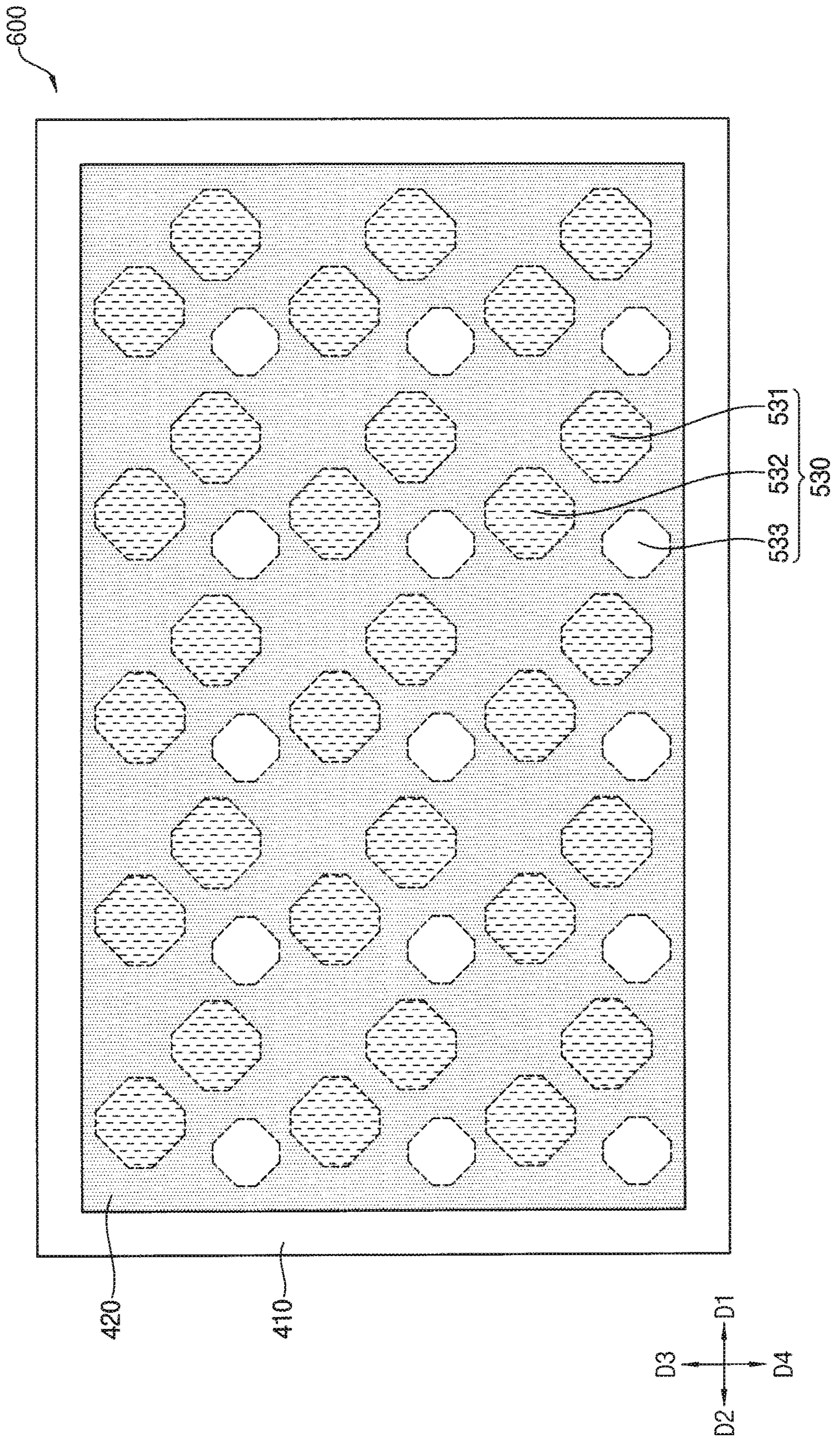
FIG. 6 is a plan view illustrating a state in which the light blocking member, a first optical filter, a second optical filter, and a third optical filter included in the display device of FIG. 1 overlap each other.

100 of FIG. 1. FIG. 3 is a plan view for describing a pixel defining layer 310 included in the display device 100 of FIG. 1. FIG. 4 is a plan view illustrating a state in which the pixel defining layer 310 and lower electrodes 290_1, 290_2, and 290_3 included in the display device 100 of FIG. 1 overlap each other. FIG. 5 is a plan view for describing a light blocking member 420 included in the display device 100 of FIG. 1. FIG. 6 is a plan view illustrating a state in which the light blocking member 420, a first optical filter 531, a second optical filter 532, and a third optical filter 533 included in the display device 100 of FIG. 1 overlap each other.

Referring to FIGS. 1, 2, 3, 4, 5, and 6 together, the display device 100 may include a lower structure 500 and an upper structure 600. The lower structure 500 and the upper structure 600 may be in direct contact with each other, and may be hermetically coupled to each other by a sealing member disposed in an outermost periphery of the display device 100. For example, the lower structure 500 and the upper structure 600 may be manufactured independently of each other, and after the upper structure 600 is located on the lower structure 500, the upper structure 600 and the lower structure 500 may be hermetically coupled to each other by the sealing member.

As illustrated in FIG. 2, the display device 100 may include a display region 10 and a peripheral region 20. Here, the display region 10 may include a plurality of pixel regions 30. The pixel regions 30 may be configured in the entire display region 10 in a form of a matrix. For example, a plane of the display device 100 is defined by first, second, third, and fourth directions D1, D2, D3, and D4. A row direction, e.g., a horizontal direction, of the pixel regions 30 is defined by the first and second directions D1 and D2. A column direction, e.g., a vertical direction, of the pixel regions 30 is defined by the third and fourth directions D3 and D4. Each of the pixel regions 30 may include a first sub-pixel region 31, a second sub-pixel region 32, and a third sub-pixel region 33.

In embodiments, in one pixel region 30, the first to third sub-pixel regions 31, 32, and 33 may be configured in a "T" shape rotated by about 45 degrees. For example, the second sub-pixel region 32 may be located and spaced apart from the first sub-pixel region 31 in one direction, and may be located and spaced apart from the third sub-pixel region 33 in another direction that is substantially perpendicular to one direction. The third sub-pixel region 33 may overlap a virtual line extending in the other direction from a space where the first sub-pixel region 31 and the second sub-pixel region 32 are spaced apart from each other. Alternatively, a location of the first sub-pixel region 31 and a location of the second sub-pixel region 32 may be changed to each other, sometimes called may be changed to be vice versa, and a location of the first sub-pixel region 31 and a location of the third sub-pixel region 33 may be changed to each other.

In embodiments, a shape of each of the first to third sub-pixel regions 31, 32, and 33 may have a plan shape of a tetragon, e.g., a square, in which each of corners is chamfered (or cut). A plan shape is a shape of an element in the plane of the display device 100 as defined by the first, second, third, and fourth directions D1, D2, D3, and D4. In addition, each of the first to third sub-pixel regions 31, 32, and 33 may have a plan shape of a square rotated by about 45 degrees. Further, an area of each of the first sub-pixel region 31 and the second sub-pixel region 32 may be greater than an area of the third sub-pixel region 33 on the plane of the display device 100. Alternatively, the area of the first sub-pixel region 31 may be different from the area of the second sub-pixel region 32.

For example, pixel structures, e.g., a semiconductor element, a pixel structure, etc., may be disposed in the first sub-pixel region 31, the second sub-pixel region 32, and the third sub-pixel region 33 of the display region 10. The light blocking member 420 may be disposed in a remaining region except for the first sub-pixel region 31, the second sub-pixel region 32, and the third sub-pixel region 33 of the display region 10. In addition, a sealing member, signal wires, power wires, and the like may be disposed in the peripheral region 20.

Although one pixel region 30 has been described as having three sub-pixel regions 31, 32, 33 in the present inventive concept, in an embodiment, one pixel region 30 may have two sub-pixel regions or at least four sub-pixel regions.

In addition, although all of the first, second, and third sub-pixel regions 31, 32, and 33 has been described as having a plan shape of a square including a chamfered corner, in an embodiment, some of the first, second, and third sub-pixel regions 31, 32, and 33 may have a plan shape of a square including a chamfered corner, and others may have a plan shape of a square rotated by about 45 degrees.

Further, although a plan shape of each of the display region 10 and the peripheral region 20 has been described as having a plan shape of a tetragon, in an embodiment, a plan shape of each of the display region 10 and the peripheral region 20 may have a plan shape of a triangle, a plan shape of a rhombus, a plan shape of a polygon, a plan shape of a circle, a plan shape of a track, or a plan shape of an ellipse.

As illustrated in FIGS. 3 and 4, the lower structure 500 may include a first substrate 110, the pixel defining layer 310, the first, second, and third lower electrodes 290_1, 290_2, and 290_3, and the like. The first, second, and third lower electrodes 290_1, 290_2, and 290_3 may be disposed on the first substrate 110. The pixel defining layer 310 may overlap a part of each of the first, second, and third lower electrodes 290_1, 290_2, and 290_3. In other words, the pixel defining layer 310 may have an opening that exposes a part of each of the first, second, and third lower electrodes 290_1, 290_2, and 290_3. For example, a first opening **310*a*, a second opening 310*b*, and a third opening 310*c* of the pixel defining layer 310 may having a plan shape of a tetragon, e.g., a square, including a chamfered corner, and each of the first, second, third openings 310*a*, 310*b*, and 310*c* may have a plan shape of a square rotated by about 45 degrees. Here, the first opening 310*a* may expose a part of the first lower electrode 290_1, the second opening 310*b* may expose a part of the second lower electrode 290_2, and the third opening 310*c* may expose a part of the third lower electrode 290_3. In addition, the first opening 310*a* may correspond to the first sub-pixel region 31, the second opening 310*b* may correspond to the second sub-pixel region 32, and the third opening 310*c* may correspond to the third sub-pixel region 33. In other words, a size of the first opening 310*a* may be a substantially same as a size of the first sub-pixel region 31, a size of the second opening 310*b* may be a substantially same as a size of the second sub-pixel region 32, and a size of the third opening 310*c* may be a substantially same as a size of the third sub-pixel region 33. That is, the first lower electrode 290_1 exposed by the pixel defining layer 310 may correspond to the first sub-pixel region 31, the second lower electrode 290_2 exposed by the pixel defining layer 310 may correspond to the second sub-pixel region 32, and the third lower electrode 290_3 exposed by the pixel defining layer 310 may correspond to the third sub-pixel region 33**.

In embodiments, when viewed in a plan view of the display device 100, each of the first lower electrode 290_1, the second lower electrode 290_2, and the third lower electrode 290_3 may have a plan shape of a square including a chamfered corner, and may have a plan shape of a square rotated by about 45 degrees. In other embodiments, some of the first lower electrode 290_1, the second lower electrode 290_2, and the third lower electrode 290_3 may have a plan shape of a square including a chamfered corner, and others may have a plan shape of a square rotated by about 45 degrees.

As illustrated in FIGS. 5 and 6, the upper structure 600 may include a second substrate 410, the light blocking member 420, optical filters 530 including a first optical filter 531, a second optical filter 532, and a third optical filter 533, and the like. The light blocking member 420 may be disposed on a lower surface of the second substrate 410, and the light blocking member 420 may include a first opening 420*a*, a second opening 420*b*, and a third opening 420*c*.

In embodiments, when viewed in a plan view of the display device 100 (or when viewed from a direction perpendicular to an upper surface of the second substrate 410), each of the first opening 420*a*, the second opening 420*b*, and the third opening 420*c* may have a plan shape of a tetragon, e.g., a square, including a chamfered corner. In addition, each of the first opening 420*a*, the second opening 420*b*, and the third opening 420*c* may have a plan shape of a square rotated by about 45 degrees. Here, the first optical filter 531 may be disposed in the first opening 420*a*, the second optical filter 532 may be disposed in the second opening 420*b*, and the third optical filter 533 may be disposed in the third opening 420*c*. As each of the first opening 420*a*, the second opening 420*b*, and the third opening 420*c* has a plan shape of a square including a chamfered corner, each of the first optical filter 531, the second optical filter 532, and the third optical filter 533 may have a plan shape of a square including a chamfered corner. In other embodiments, one of the first opening 420*a*, the second opening 420*b*, and the third opening 420*c* may have a plan shape of a square including a chamfered corner, and others may have a plan shape of a square rotated by about 45 degrees.

In addition, when viewed in a plan view of the display device 100, an area of the first optical filter 531 (or the first opening 420*a*) and an area of the second optical filter 532 (or the second opening 420*b*) may be greater than an area of the third optical filter 533 (or the third opening 420*c*). Alternatively, the area of the first optical filter 531 (or the first opening 420*a*) and the area of the second optical filter 532 (or the second opening 420*b*) may be different from each other.

Further, each of the first opening 420*a*, the second opening 420*b*, and the third opening 420*c* may overlap (or correspond to) the first sub-pixel region 31 (or the first opening 310*a*), the second sub-pixel region 32 (or the second opening 310*b*), and the third sub-pixel region 33 (or the third opening 310*c*), respectively. Sizes of the first opening 420*a*, the second opening 420*b*, and the third opening 420*c* may be greater than sizes of the first sub-pixel region 31 (or the first opening 310*a*), the second sub-pixel region 32 (or the second opening 310*b*), and the third sub-pixel region 33 (or the third opening 310*c*), respectively.

For example, a light emitting layer may be disposed in the first opening 310*a*, the second opening 310*b*, and the third opening 310*c* of the pixel defining layer 310. Light emitted from the light emitting layer may pass through the optical filters 530 disposed in each of the first opening 420*a*, the second opening 420*b*, and the third opening 420*c* of the light blocking member 420 so as to be emitted to an outside of the display device 100.

Figure 7:
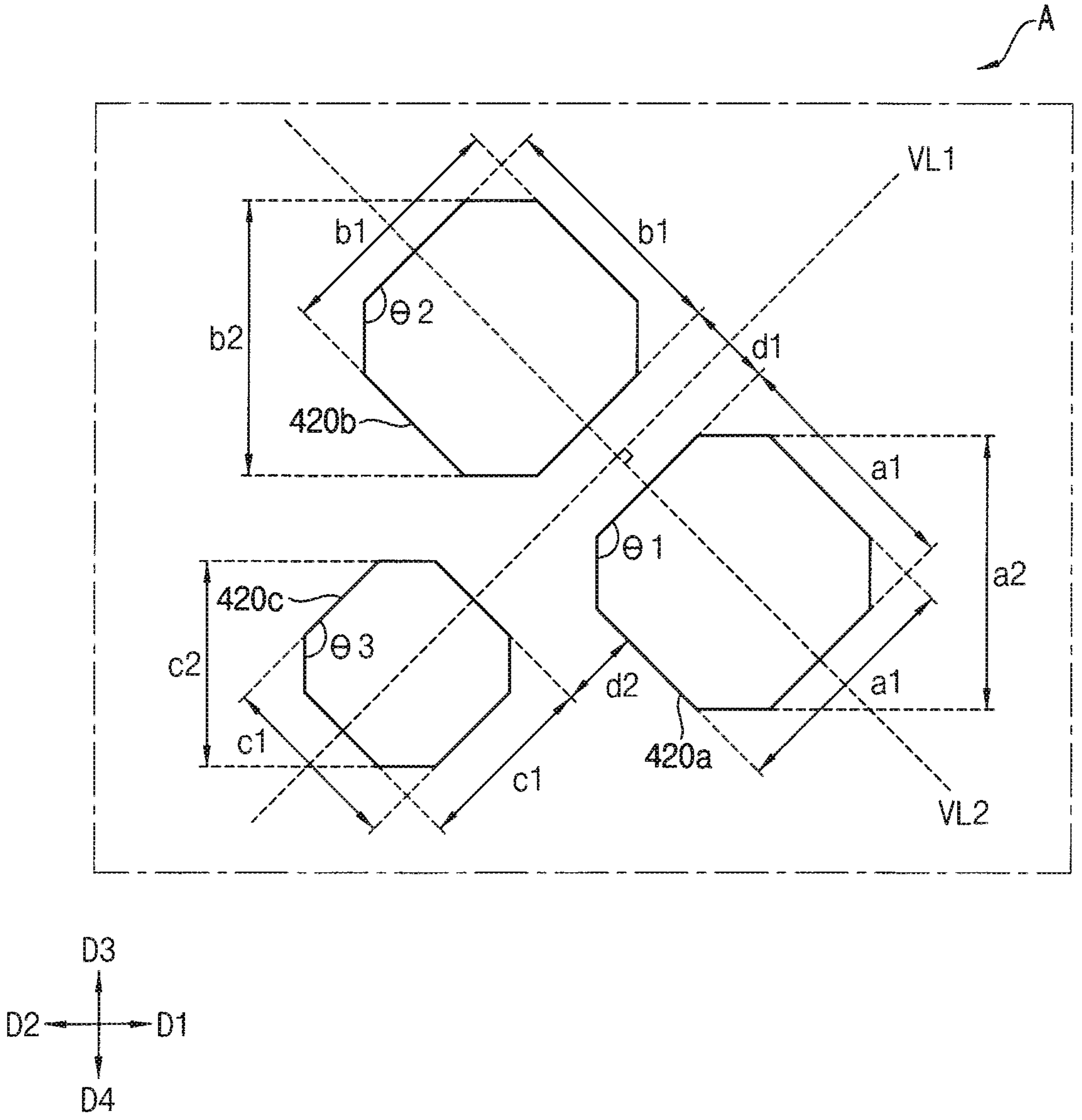
FIG. 7 is a partially enlarged plan view illustrating a region A of FIG. 5.
Figure 8:
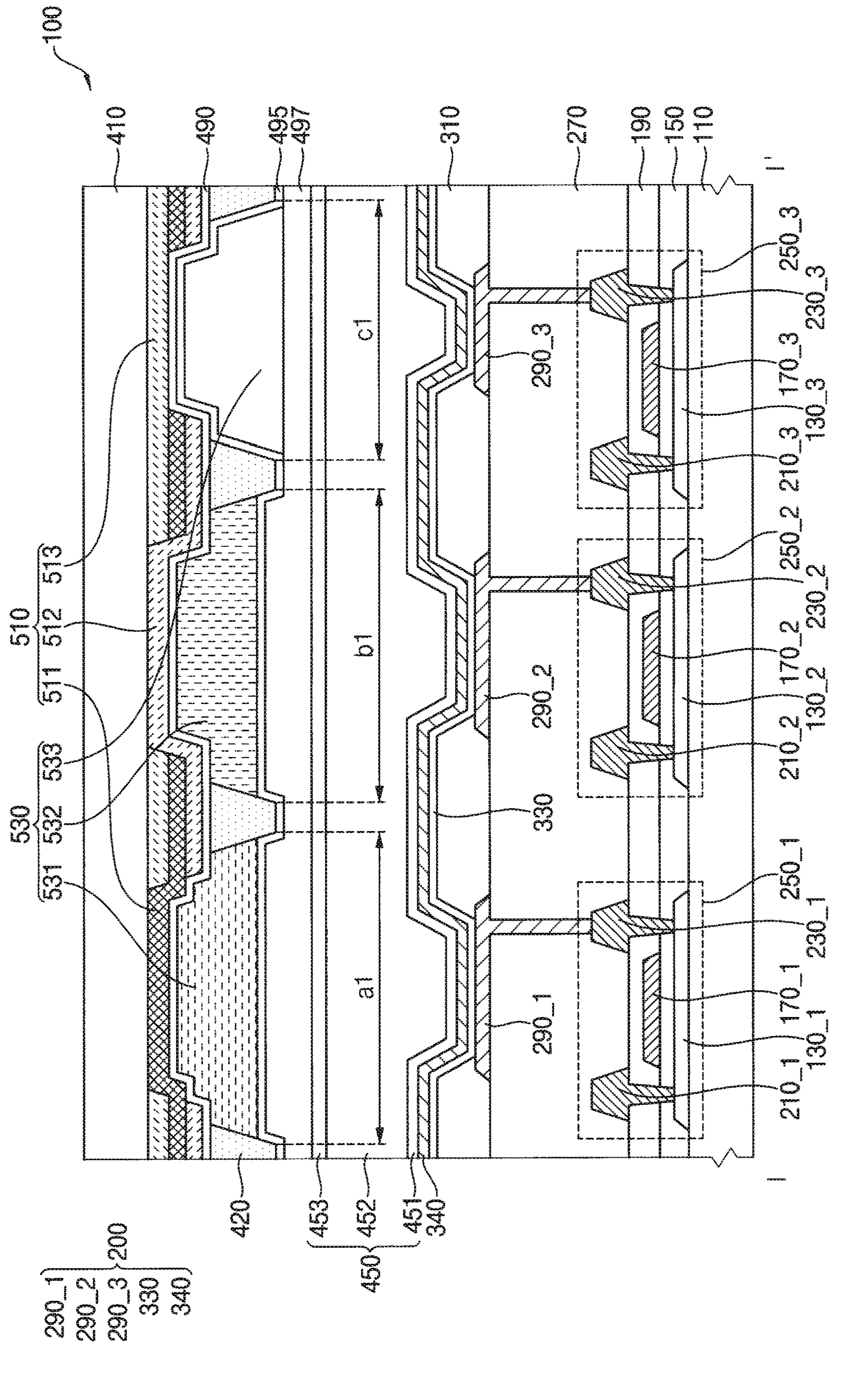
FIG. 8 is a cross-sectional view taken along a line I-I' of FIG. 2.

FIG. 7 is a partially enlarged plan view illustrating a region A of FIG. 5. FIG. 8 is a cross-sectional view taken along a line I-I' of FIG. 2.

Referring to FIGS. 7, 8, 12, and 19, the display device 100 may include the lower structure 500 and the upper structure 600.

The lower structure 500 may include the first substrate 110, a first semiconductor element 250_1, a second semiconductor element 250_2, a third semiconductor element 250_3, a gate insulation layer 150, an insulating interlayer 190, a planarization layer 270, a pixel structure 200, a pixel defining layer 310, a thin film encapsulation structure 450, and the like.

Figure 11:
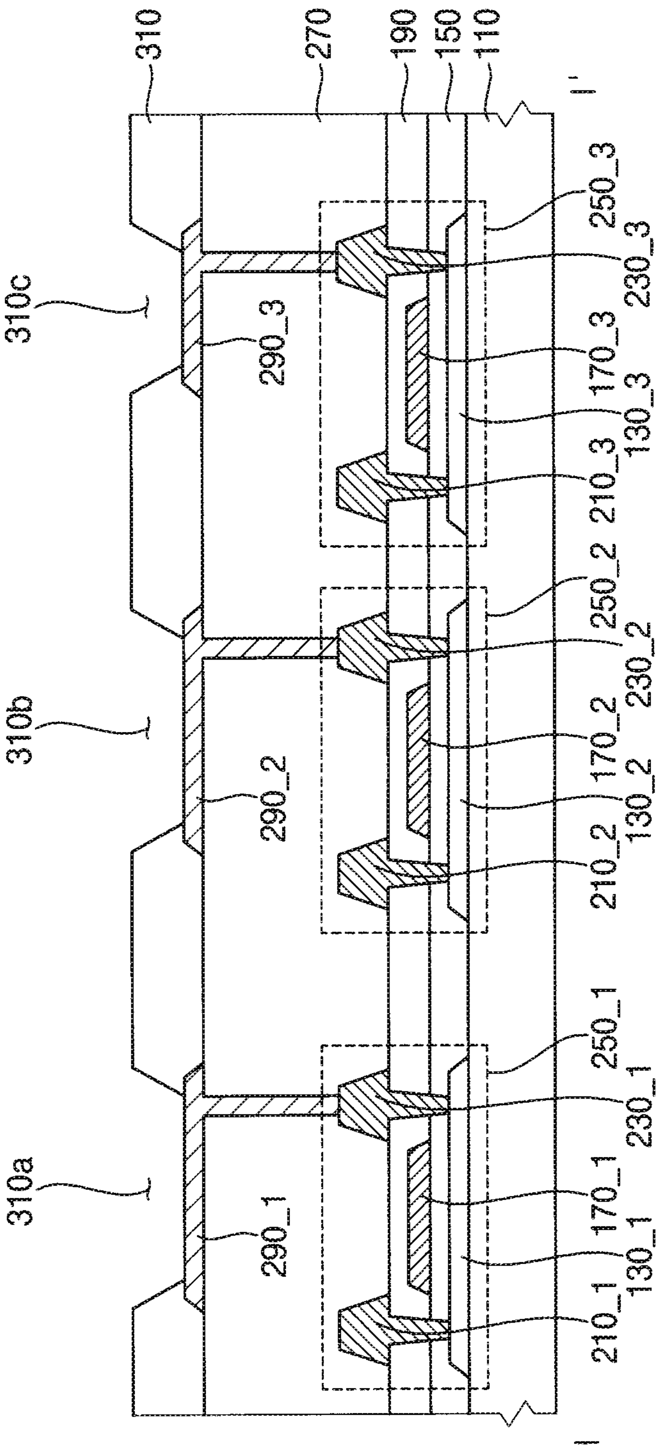

The pixel structure 200 may include the first lower electrode 290_1, the second lower electrode 290_2, the third lower electrode 290_3, a light emitting layer 330, and an upper electrode 340. Here, the first lower electrode 290_1, the light emitting layer 330, and the upper electrode 340 are defined as a first sub-pixel structure, the second lower electrode 290_2, the light emitting layer 330, and the upper electrode 340 are defined as a second sub-pixel structure, and the third lower electrode 290_3, the light emitting layer 330, and the upper electrode 340 are defined as a third sub-pixel structure. The first semiconductor element 250_1 may include a first active layer 130_1, a first gate electrode 170_1, a first source electrode 210_1, and a first drain electrode 230_1. The second semiconductor element 250_2 may include a second active layer 130_2, a second gate electrode 170_2, a second source electrode 210_2, and a second drain electrode 230_2. The third semiconductor element 250_3 may include a third active layer 130_3, a third gate electrode 170_3, a third source electrode 210_3, and a third drain electrode 230_3. In addition, the thin film encapsulation structure 450 may include a first inorganic thin film encapsulation layer 451, an organic thin film encapsulation layer 452, and a second inorganic thin film encapsulation layer 453. As illustrated in FIG. 11, the pixel defining layer 310 may include a first opening 310*a*, a second opening 310*b*, and a third opening 310*c*.

The upper structure 600 may include a first protective insulating layer 495, a second protective insulating layer 490, the optical filters 530, an intermediate layer 497, color filters 510, the light blocking member 420, the second substrate 410, and the like. Here, the optical filters 530 may include the first optical filter 531, e.g., a first quantum dot pattern, the second optical filter 532, e.g., a second quantum dot pattern, and the third optical filter 533, e.g., a scattering pattern. Further, the color filters 510 may include a first color filter 511, a second color filter 512, and a third color filter 513.

As illustrated in FIG. 2, the first sub-pixel structure may be disposed in the first sub-pixel region 31, the second sub-pixel structure may be disposed in the second sub-pixel region 32, and the third sub-pixel structure may be disposed in the third sub-pixel region 33. The display device 100 may display an image through the first to third sub-pixel structures.

Referring again to FIG. 8, the first substrate 110 including a transparent or opaque material may be provided. The first substrate 110 may include a quartz substrate, a synthetic quartz substrate, a calcium fluoride substrate, a fluorine-doped quartz, i.e., F-doped quartz, substrate, a soda lime glass substrate, a non-alkali glass substrate, and the like.

In other embodiments, the first substrate 110 may be configured as a transparent resin substrate having flexibility. Examples of the transparent resin substrate that may be used as the first substrate 110 may include a polyimide substrate.

In this case, the polyimide substrate may have a stacked structure including a first polyimide layer, a barrier film layer, a second polyimide layer, and the like.

A buffer layer may be disposed on the first substrate 110. The buffer layer may be disposed on the entire first substrate 110. The buffer layer may prevent metal atoms or impurities from diffusing from the first substrate 110 to the semiconductor element and the sub-pixel structure, and may control a heat transfer rate during a crystallization process for forming the active layer to obtain a substantially uniform active layer. In addition, when a surface of the first substrate 110 is not uniform, the buffer layer may serve to improve flatness of the surface of the first substrate 110. Depending on a type of the first substrate 110, at least two buffer layers may be provided on the first substrate 110, or the buffer layer may not be provided. For example, the buffer layer may include an organic insulating material or an inorganic insulating material.

The first to third active layers 130_1, 130_2, and 130_3 may be disposed on the first substrate 110 while being spaced apart from each other. Each of the first to third active layers 130_1, 130_2, and 130_3 may include a metal oxide semiconductor, an inorganic semiconductor, e.g., amorphous silicon or poly silicon, an organic semiconductor, or the like, and may include a source region and a drain region.

The gate insulation layer 150 may be disposed on the first to third active layers 130_1, 130_2, and 130_3. The gate insulation layer 150 may cover the first to third active layers 130_1, 130_2, and 130_3 on the first substrate 110, and may be disposed on the entire first substrate 110. For example, the gate insulation layer 150 may sufficiently cover the first to third active layers 130_1, 130_2, and 130_3 on the first substrate 110, and may have a substantially flat upper surface without creating a step around the first to third active layers 130_1, 130_2, and 130_3. Alternatively, the gate insulation layer 150 may be disposed along a profile of the first to third active layers 130_1, 130_2, and 130_3 with a uniform thickness to cover the first to third active layers 130_1, 130_2, and 130_3 on the first substrate 110. The gate insulation layer 150 may include a silicon compound, metal oxide, or the like. For example, the gate insulation layer 150 may include silicon oxide ($SiO_x$), silicon nitride ($SiN_x$), silicon oxynitride ($SiO_xN_y$), silicon oxycarbide ($SiO_xC_y$), silicon carbonitride ($SiC_xN_y$), aluminum oxide ($AlO_x$), aluminum nitride ($AlN_x$), tantalum oxide ($TaO_x$), hafnium oxide ($HfO_x$), zirconium oxide ($ZrO_x$), titanium oxide ($TiO_x$), and the like. In other embodiments, the gate insulation layer 150 may have a multilayer structure including a plurality of insulation layers. For example, the insulation layers may have mutually different thicknesses, or may include mutually different materials.

The first to third gate electrodes 170_1, 170_2, and 170_3 may be disposed on the gate insulation layer 150 while being spaced apart from each other. For example, the first gate electrode 170_1 may be disposed on a portion of the gate insulation layer 150 under which the first active layer 130_1 is located, the second gate electrode 170_2 may be disposed on a portion of the gate insulation layer 150 under which the second active layer 130_2 is located, and the third gate electrode 170_3 may be disposed on a portion of the gate insulation layer 150 under which the third active layer 130_3 is located. Each of the first to third gate electrodes 170_1, 170_2, and 170_3 may include a metal, an alloy, metal nitride, conductive metal oxide, a transparent conductive material, and the like. These may be used alone or in combination with each other. In other embodiments, each of the first to third gate electrodes 170_1, 170_2, and 170_3 may have a multilayer structure including a plurality of metal layers. For example, the metal layers may have mutually different thicknesses, or may include mutually different materials.

The insulating interlayer 190 may be disposed on the first to third gate electrodes 170_1, 170_2, and 170_3. The insulating interlayer 190 may cover the first to third gate electrodes 170_1, 170_2, and 170_3 on the gate insulation layer 150, and may be disposed on the entire gate insulation layer 150. For example, the insulating interlayer 190 may sufficiently cover the first to third gate electrodes 170_1, 170_2, and 170_3 on the gate insulation layer 150, and may have a substantially flat upper surface without creating a step around the first to third gate electrodes 170_1, 170_2, and 170_3. Alternatively, the insulating interlayer 190 may be disposed along a profile of the first to third gate electrodes 170_1, 170_2, and 170_3 with a uniform thickness to cover the first to third gate electrodes 170_1, 170_2, and 170_3 on the gate insulation layer 150. The insulating interlayer 190 may include a silicon compound, metal oxide, or the like. In other embodiments, the insulating interlayer 190 may have a multilayer structure including a plurality of insulation layers. For example, the insulation layers may have mutually different thicknesses, or may include mutually different materials.

The first source electrode 210_1, the first drain electrode 230_1, the second source electrode 210_2, the second drain electrode 230_2, the third source electrode 210_3, and the third drain electrode 230_3 may be disposed on the insulating interlayer 190 while being spaced apart from each other. For example, the first source electrode 210_1 may be connected to the source region of the first active layer 130_1 through a contact hole formed by removing first portions of the gate insulation layer 150 and the insulating interlayer 190. The first drain electrode 230_1 may be connected to the drain region of the first active layer 130_1 through a contact hole formed by removing second portions of the gate insulation layer 150 and the insulating interlayer 190. In addition, the second source electrode 210_2 may be connected to the source region of the second active layer 130_2 through a contact hole formed by removing third portions of the gate insulation layer 150 and the insulating interlayer 190. The second drain electrode 230_2 may be connected to the drain region of the second active layer 130_2 through a contact hole formed by removing fourth portions of the gate insulation layer 150 and the insulating interlayer 190. Further, the third source electrode 210_3 may be connected to the source region of the third active layer 130_3 through a contact hole formed by removing fifth portions of the gate insulation layer 150 and the insulating interlayer 190. The third drain electrode 230_3 may be connected to the drain region of the third active layer 130_3 through a contact hole formed by removing sixth portions of the gate insulation layer 150 and the insulating interlayer 190. Each of the first to third source electrodes 210_1, 210_2, and 210_3 and the first to third drain electrodes 230_1, 230_2, and 230_3 may include a metal, an alloy, metal nitride, conductive metal oxide, a transparent conductive material, and the like. These may be used alone or in combination with each other. In other embodiments, each of the first to third source electrodes 210_1, 210_2, and 210_3 and the first to third drain electrodes 230_1, 230_2, and 230_3 may have a multilayer structure including a plurality of metal layers. For example, the metal layers may have mutually different thicknesses, or may include mutually different materials.

Accordingly, the first semiconductor element 250_1 including the first active layer 130_1, the first gate electrode 170_1, the first source electrode 210_1, and the first drain electrode 230_1 may be disposed, the second semiconductor element 250_2 including the second active layer 130_2, the second gate electrode 170_2, the second source electrode 210_2, and the second drain electrode 230_2 may be disposed, and the third semiconductor element 250_3 including the third active layer 130_3, the third gate electrode 170_3, the third source electrode 210_3, and the third drain electrode 230_3 may be disposed.

However, although the display device 100 has been described as having a configuration including three transistors, e.g., first to third semiconductor elements 250_1, 250_2, and 250_3, in an embodiment, the display device 100 may have a configuration including a plurality of transistors and a plurality of capacitors.

In addition, although each of the first to third semiconductor elements 250_1, 250_2, and 250_3 has been described as having a top gate structure, in an embodiment, each of the first to third semiconductor elements 250_1, 250_2, and 250_3 may have a bottom gate structure and/or a double gate structure.

Further, although it has been described that the gate insulation layer 150 and the insulating interlayer 190 are not included in each of the first to third semiconductor elements 250_1, 250_2, and 250_3, in an embodiment, the gate insulation layer 150 and the insulating interlayer 190 may be included in each of the first to third semiconductor elements 250_1, 250_2, and 250_3.

The planarization layer 270 may be disposed on the insulating interlayer 190 and the first to third semiconductor elements 250_1, 250_2, and 250_3. For example, the planarization layer 270 may be disposed as a relatively thick thickness to sufficiently cover the first to third source electrodes 210_1, 210_2, and 210_3 and the first to third drain electrodes 230_1, 230_2, and 230_3 on the insulating interlayer 190. In this case, the planarization layer 270 may have a substantially flat upper surface. In order to implement such a flat upper surface of the planarization layer 270, a planarization process may be additionally performed on the planarization layer 270. The planarization layer 270 may include an organic insulating material, an inorganic insulating material, or the like. In embodiments, the planarization layer 270 may include an organic insulating material.

The first to third lower electrodes 290_1, 290_2, and 290_3 may be disposed on the planarization layer 270 while being spaced apart from each other. For example, as illustrated in FIGS. 3 and 4, the first lower electrode 290_1 may be disposed on the planarization layer 270 to overlap the first opening 310*a* of the pixel defining layer 310, the second lower electrode 290_2 may be disposed on the planarization layer 270 to overlap the second opening 310*b*, and the third lower electrode 290_3 may be disposed on the planarization layer 270 to overlap the third opening 310*c*. In embodiments, when viewed in a plan view of the display device 100, each of the first to third lower electrodes 290_1, 290_2, and 290_3 may have a plan shape of a square including a chamfered corner, and may have a plan shape of a square rotated by about 45 degrees. In addition, when viewed in a plan view of the display device 100, an area of each of the first and second lower electrodes 290_1 and 290_2 may be greater than an area of the third lower electrode 290_3. Alternatively, the area of the first lower electrode 290_1 may be different from the area of the second lower electrode 290_2.

Each of the first to third lower electrodes 290_1, 290_2, and 290_3 may pass through the planarization layer 270 so as to be connected to the first to third drain electrodes 230_1, 230_2, and 230_3, respectively. That is, the first to third lower electrodes 290_1, 290_2, and 290_3 may be electrically connected to the first to third semiconductor elements 250_1, 250_2, and 250_3, respectively. Each of the first to third lower electrodes 290_1, 290_2, and 290_3 may include a metal, an alloy, metal nitride, conductive metal oxide, a transparent conductive material, and the like. For example, each of the first to third lower electrodes 290_1, 290_2, and 290_3 may include gold (Au), silver (Ag), aluminum (Al), platinum (Pt), nickel (Ni), titanium (Ti), palladium (Pd), magnesium (Mg), calcium (Ca), lithium (Li), chromium (Cr), tantalum (Ta), tungsten (W), copper (Cu), molybdenum (Mo), scandium (Sc), neodymium (Nd), iridium (Ir), an aluminum-containing alloy, aluminum nitride ($AlN_x$), a silver-containing alloy, tungsten nitride ($WN_x$), a copper-containing alloy, a molybdenum-containing alloy, titanium nitride ($TiN_x$), chromium nitride ($CrN_x$), tantalum nitride ($TaN_x$), strontium ruthenium oxide ($SrRu_xO_y$), zinc oxide ($ZnO_x$), indium tin oxide (ITO), tin oxide ($SnO_x$), indium oxide ($InO_x$), gallium oxide ($GaO_x$), indium zinc oxide (IZO), and the like. These may be used alone or in combination with each other. Alternatively, each of the first to third lower electrodes 290_1, 290_2, and 290_3 may have a multilayer structure including a plurality of metal layers. For example, the metal layers may have mutually different thicknesses, or may include mutually different materials.

The pixel defining layer 310 may be disposed on the planarization layer 270 and a part of each of the first to third lower electrodes 290_1, 290_2, and 290_3. The pixel defining layer 310 may cover both side portions, e.g., an outer periphery, of each of the first to third lower electrodes 290_1, 290_2, and 290_3, and may expose a part of an upper surface of each of the first to third lower electrodes 290_1, 290_2, and 290_3. In other words, the pixel defining layer 310 may include the first opening 310*a*, the second opening 310*b*, and the third opening 310*c*, which expose the parts of the upper surfaces of the first to third lower electrodes 290_1, 290_2, and 290_3, respectively. In embodiments, when viewed in a plan view of the display device 100, as illustrated in FIG. 3, the first to third openings 310*a*, 310*b*, and 310*c* may have a plan shape of a square including a chamfered corner, and may have a plan shape of a square rotated by about 45 degrees. In addition, when viewed in a plan view of the display device 100, an area of each of the first and second openings 310*a* and 310*b* may be greater than an area of the third opening 310*c*. Alternatively, the area of the first opening 310*a* may be different from the area of the second openings 310*b*. In other embodiments, some of the first to third openings 310*a*, 310*b*, and 310*c* may have a plan shape of a square including a chamfered corner, and others may have a plan shape of a square rotated by about 45 degrees.

The pixel defining layer 310 may be formed of an organic insulating material or an inorganic insulating material. In embodiments, the pixel defining layer 310 may include an organic insulating material. For example, the pixel defining layer 310 may include a photoresist, a polyacryl-based resin, a polyimide-based resin, a polyamide-based resin, a siloxane-based resin, an acryl-based resin, an epoxy-based resin, and the like.

The light emitting layer 330 may be disposed on the pixel defining layer 310 and the upper surface of each of the first to third lower electrodes 290_1, 290_2, and 290_3 exposed by the pixel defining layer 310. In other words, the light emitting layer 330 may be continuously disposed on the first substrate 110, and may be integrally formed. In embodiments, the light emitting layer 330 may be formed by using a light emitting material capable of emitting a blue color of light. For example, since the light emitting layer 330 emits the blue color of light, a light loss rate of the blue color of light emitted to the outside may be relatively small after the blue color of light passes through the third optical filter 533. Therefore, the third opening 310*c* may be relatively small. Otherwise, the light emitting layer 330 may be formed by stacking a plurality of light emitting materials capable of generating different color of lights such as a red color of light, a green color of light, and a blue color of light to emit a white color of light as a whole.

The upper electrode 340 may be disposed on the pixel defining layer 310 and the light emitting layer 330. The upper electrode 340 may include a metal, an alloy, metal nitride, conductive metal oxide, a transparent conductive material, and the like. These may be used alone or in combination with each other. In other embodiments, the upper electrode 340 may have a multilayer structure including a plurality of metal layers. For example, the metal layers may have mutually different thicknesses, or may include mutually different materials.

Accordingly, the first sub-pixel structure including the first lower electrode 290_1, the light emitting layer 330, and the upper electrode 340 may be disposed, the second sub-pixel structure including the second lower electrode 290_2, the light emitting layer 330, and the upper electrode 340 may be disposed, and the third sub-pixel structure including the third lower electrode 290_3, the light emitting layer 330, and the upper electrode 340 may be disposed. That is, the pixel structure 200 including the first lower electrode 290_1, the second lower electrode 290_2, the third lower electrode 290_3, the light emitting layer 330, and the upper electrode 340 may be disposed.

The first inorganic thin film encapsulation layer 451 may be disposed on the upper electrode 340. The first inorganic thin film encapsulation layer 451 may be disposed along a profile of the upper electrode 340 with a uniform thickness to cover the upper electrode 340. The first inorganic thin film encapsulation layer 451 may prevent the pixel structure 200 from deteriorating due to infiltration of moisture, oxygen, and the like. In addition, the first inorganic thin film encapsulation layer 451 may also perform a function of protecting the pixel structure 200 from an external impact. The first inorganic thin film encapsulation layer 451 may include an inorganic insulating material having flexibility.

The organic thin film encapsulation layer 452 may be disposed on the first inorganic thin film encapsulation layer 451. The organic thin film encapsulation layer 452 may improve flatness of the display device 100, and may protect the pixel structure 200. The organic thin film encapsulation layer 452 may include an organic insulating material having flexibility.

The second inorganic thin film encapsulation layer 453 may be disposed on the organic thin film encapsulation layer 452. The second inorganic thin film encapsulation layer 453 may be disposed along a profile of the organic thin film encapsulation layer 452 with a uniform thickness to cover the organic thin film encapsulation layer 452. The second inorganic thin film encapsulation layer 453 may prevent the pixel structure 200 from deteriorating due to the infiltration of moisture, oxygen, and the like together with the first inorganic thin film encapsulation layer 451. In addition, the second inorganic thin film encapsulation layer 453 may also perform the function of protecting the pixel structure 200 from an external impact together with the first inorganic thin film encapsulation layer 451 and the organic thin film encapsulation layer 452. The second inorganic thin film encapsulation layer 453 may include the inorganic insulating material having flexibility.

Accordingly, the thin film encapsulation structure 450 including the first inorganic thin film encapsulation layer 451, the organic thin film encapsulation layer 452, and the second inorganic thin film encapsulation layer 453 may be disposed between the intermediate layer 497 and the upper electrode 340. Alternatively, the thin film encapsulation structure 450 may have a five-layer structure in which first to fifth thin film encapsulation layers are stacked, or a seven-layer structure in which first to seventh thin film encapsulation layers are stacked.

As described above, the lower structure 500 including the first substrate 110, the first semiconductor element 250_1, the second semiconductor element 250_2, the third semiconductor element 250_3, the gate insulation layer 150, the insulating interlayer 190, the planarization layer 270, the pixel structure 200, the pixel defining layer 310, and the thin film encapsulation structure 450 may be provided.

The second substrate 410 may be disposed on the thin film encapsulation structure 450. The second substrate 410 may face (or oppose) the first substrate 110. The second substrate 410 and the first substrate 110 may include a substantially same material. For example, the second substrate 410 may include a quartz substrate, a synthetic quartz substrate, a calcium fluoride substrate, a fluorine-doped quartz substrate, a soda lime glass substrate, a non-alkali glass substrate, and the like.

Figure 13:
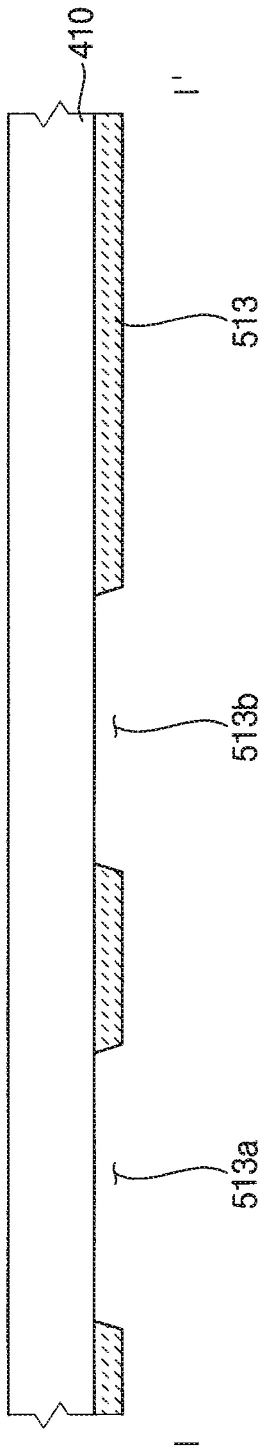

The third color filter 513 may be disposed on a lower surface of the second substrate 410. In other words, the third color filter 513 may be disposed between the second substrate 410 and the third optical filter 533 to overlap the third optical filter 533. As illustrated in FIG. 13, the third color filter 513 may have openings 513*a* and 513*b*. For example, the third color filter 513 may be disposed in the third sub-pixel region 33 to extend in first to fourth directions D1, D2, D3, and D4, and may include the openings 513*a* and 513*b* that overlap the first optical filter 531 and the second optical filter 532 in portions where the first optical filter 531 and the second optical filter 532 are located, respectively. That is, a portion of the third color filter 513 that overlaps the third lower electrode 290_3 may function as a color filter. In embodiments, the third color filter 513 may transmit a blue color of light, and may be a color filter having a blue color, e.g., a first color.

Figure 14:
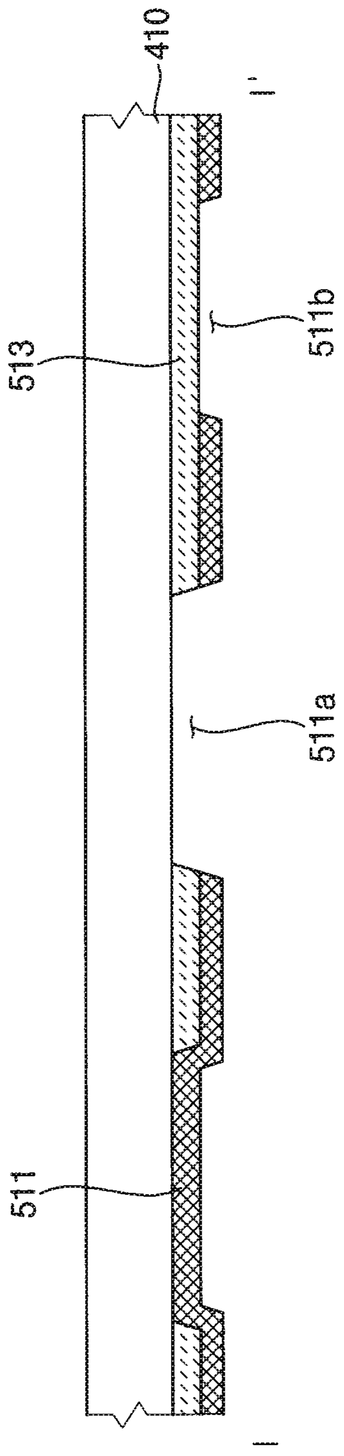

The first color filter 511 may be disposed under the second color filter 512 and the lower surface of the second substrate 410. In other words, the first color filter 511 may be disposed between the second substrate 410 and the first optical filter 531 to overlap the first optical filter 531. As illustrated in FIG. 14, the first color filter 511 may have openings 511*a* and 511*b*. For example, the first color filter 511 may be disposed in the opening 513*a* of the third color filter 513 (or may overlap the first optical filter 531) to extend in the first to fourth directions D1, D2, D3, and D4, and may include the opening 511*a* that exposes the opening 513*b* of the third color filter 513 (or overlaps the third optical filter 533) and the opening 511*b* that exposes a part of a lower surface of the third color filter 513 under the third color filter 513 (or overlaps the third optical filter 533). That is, a portion of the first color filter 511 that overlaps the first lower electrode 290_1 may function as a color filter. In embodiments, the first color filter 511 may transmit a red color of light, and may be a color filter having a red color, e.g., a second color.

The second color filter 512 may be disposed under the first color filter 511 and the lower surface of the second substrate

410. In other words, the second color filter 512 may be disposed between the second substrate 410 and the third optical filter 533 to overlap the second optical filter 532. For example, the second color filter 512 may be disposed in the opening 511*a* of the first color filter 511 (or may overlap the second optical filter 532) to extend in the first to fourth directions D1, D2, D3, and D4, and may include a first opening that exposes the opening 511*b* of the first color filter 511 (or overlaps the third optical filter 533) and a second opening that exposes a part of a lower surface of the first color filter 511 under the first color filter 511 (or overlaps the first optical filter 531). That is, a portion of the second color filter 512 that overlaps the second lower electrode 290_2 may function as a color filter. In embodiments, the second color filter 512 may transmit a green color of light, and may be a color filter having a green color, e.g., a third color.

Figure 15:
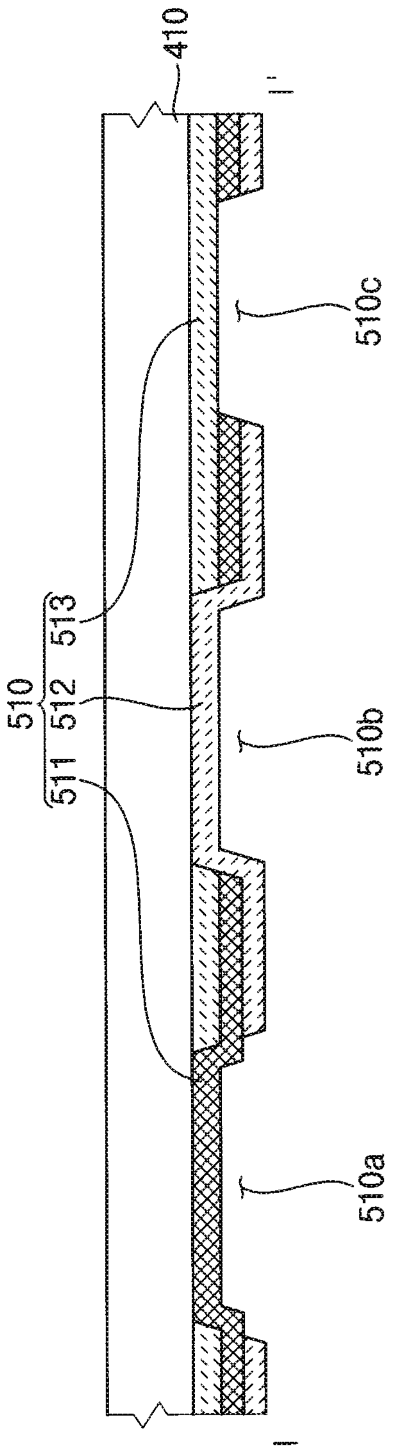

Accordingly, the color filters 510 including the first color filter 511, the second color filter 512, and the third color filter 513 may be disposed. As illustrated in FIG. 15, the second opening of the second color filter 512 is defined as a first opening 510*a* of the color filters 510, a portion in which the second color filter 512 is disposed is defined as a second opening 510*b* of the color filters 510, and the opening 511*b* of the first color filter 511 and the first opening of the second color filter 512 is defined as a third opening 510*c* of the color filters 510. The color filters 510 may include a photosensitive resin or a color photoresist.

In embodiments, the first opening 510*a*, the second opening 510*b*, and the third opening 510*c* may be defined by a part of the first color filter 511, a part of the second color filter 512, and a part of the third color filter 513 disposed in both side portions of the first opening 510*a*, the second opening 510*b*, and the third opening 510*c*, respectively. In other words, since the part of the first color filter 511, the part of the second color filter 512, and the part of the third color filter 513 are disposed in the both side portions of the first opening 510*a*, the second opening 510*b*, and the third opening 510*c* so as to define the first opening 510*a*, the second opening 510*b*, and the third opening 510*c*, respectively, it is unnecessary to add a light blocking pattern that defines the first opening 510*a*, the second opening 510*b*, and the third opening 510*c* to the display device 100 according to the present inventive concept.

However, although the color filters 510 according to the present inventive concept have been described as including a green color filter, a blue color filter, and a red color filter, in an embodiment, the color filters 510 may include a yellow color filter pattern, a cyan color filter pattern, and a magenta color filter pattern.

In addition, although the red color filter, the green color filter, and the blue color filter according to the present inventive concept have been described as being sequentially configured, in an embodiment, the configuration of the color filters may be changed.

The second protective insulating layer 490 may be disposed under the color filters 510. The second protective insulating layer 490 may cover the color filters 510 on the lower surface of the second substrate 410. For example, the second protective insulating layer 490 may be disposed along a profile of the color filters 510 with a uniform thickness to cover the color filters 510 on the lower surface of the second substrate 410. Alternatively, the second protective insulating layer 490 may sufficiently cover the color filters 510 on the lower surface of the second substrate 410, and may have a substantially flat upper surface without creating a step around the color filters 510. The second protective insulating layer 490 may include an inorganic insulating material or an organic insulating material. In embodiments, the second protective insulating layer 490 may include an inorganic insulating material such as silicon nitride. In other embodiments, the second protective insulating layer 490 may have a multilayer structure including a plurality of insulation layers. For example, the insulation layers may have mutually different thicknesses, or may include mutually different materials.

A refractive index conversion layer may be disposed between the second protective insulating layer 490 and the optical filters 530. For example, light that has passed through the optical filters 530 may pass through the refractive index conversion layer before the light passes through the color filters 510, and a refractive index of the light may be changed. The refractive index conversion layer may include hollow silica having a predetermined refractive index.

Figure 16:
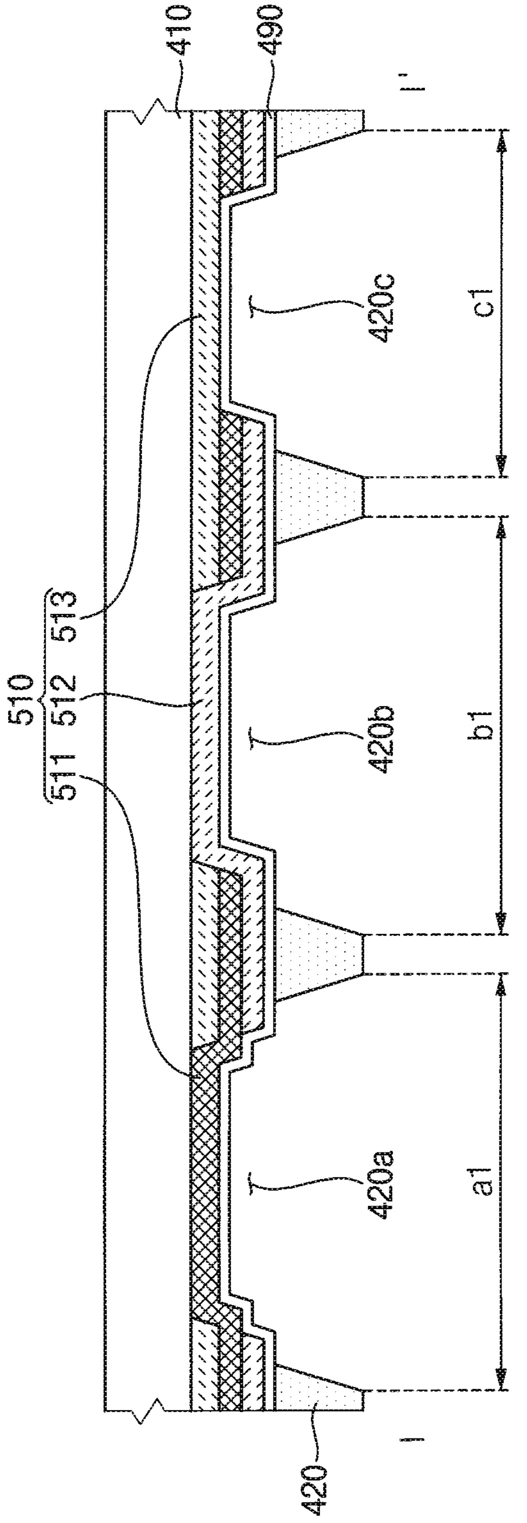

The light blocking member 420 may be disposed on a lower surface of the second protective insulating layer 490. In other words, the light blocking member 420 may be disposed on the pixel structure 200. As illustrated in FIG. 16, the light blocking member 420 may include a first opening 420*a*, a second opening 420*b*, and a third opening 420*c*. For example, the light blocking member 420 may include an opening part including the first opening 420*a*, the second opening 420*b*, and the third opening 420*c*, and a light blocking part. The light blocking part may overlap the part of the first color filter 511, the part of the second color filter 512, and the part of the third color filter 513 that define the first opening 510*a*, the second opening 510*b*, and the third opening 510*c*. In embodiments, when viewed in a plan view of the display device 100, as illustrated in FIGS. 5 and 6, the first to third openings 420*a*, 420*b*, and 420*c* may have a plan shape of a square including a chamfered corner, and may have a plan shape of a square rotated by about 45 degrees. In addition, an area of each of the first and second openings 420*a* and 420*b* may be greater than an area of the third opening 420*c*. Alternatively, the area of the first opening 420*a* may be different from the area of the second opening 420*b*. The light blocking member 420 may have a plate shape including the first opening 420*a*, the second opening 420*b*, and the third opening 420*c*. In addition, the first opening 510*a*, the second opening 510*b*, and the third opening 510*c* of the color filters 510 may overlap the first opening 420*a*, the second opening 420*b*, and the third opening 420*c* of the light blocking member 420, respectively.

As illustrated in FIGS. 7 and 16, each of the first to third openings 420*a*, 420*b*, and 420*c* may have a shape rotated (or inclined) at a predetermined angle with respect to (or based on) a vertical direction (or in a column direction of the first to third sub-pixel regions 31, 32, and 33) or a horizontal direction (or in a row direction of the first to third sub-pixel regions 31, 32, and 33), and may have a plan shape of a tetragon (or a square) including a chamfered corner. In embodiments, the predetermined angle may be about 45 degrees.

However, for convenience of explanation, although the chamfered corner of each of the first to third openings 420*a*, 420*b*, and 420*c* is largely illustrated in FIG. 7, a shape of each of the first to third openings 420*a*, 420*b*, and 420*c* is defined as a plan shape of a square including the chamfered corner not a plan shape of an octagon because an area of the chamfered corner is substantially small.

A short (or minor) axis of the first opening 420*a* may have a first width a1, and a long (or major) axis of the first opening 420*a* may have a second width a2. Here, the first width a1 may correspond to a length of a side of the square before the corner is chamfered. The second width a2 may correspond to a length between chamfered corners facing each other among the chamfered corners. For example, when a length of a short axis of the square is 1, a length of a long axis of the square may be $2^{1/2}$. Even if the corners of the square are chamfered, the length of the long axis may be greater than 1. In other words, a distance between the chamfered corners facing each other may be greater than a distance between opposite sides among sides of the first opening 420*a*. That is, a length of a long axis may be greater than a length of the short axis. Since a corner of the first opening 420*a* is chamfered, an angle between the chamfered corner and the side of the first opening 420*a* may be an obtuse angle θ1.

In addition, a short axis of the second opening 420*b* may have a third width b1, and a long axis of the second opening 420*b* may have a fourth width b2 Here, the third width b1 may correspond to a length of a side of the square before the corner is chamfered. The fourth width b2 may correspond to a length between chamfered corners facing each other among the chamfered corners. A distance between the chamfered corners facing each other may be greater than a distance between opposite sides among sides of the second opening 420*b*. That is, a length of a long axis may be greater than a length of the short axis. Since a corner of the second opening 420*b* is chamfered, an angle between the chamfered corner and the side of the second opening 420*b* may be an obtuse angle θ2.

Further, a short axis of the third opening 420*c* may have a fifth width c1, and a long axis of the third opening 420*c* may have a sixth width c2 Here, the fifth width c1 may correspond to a length of a side of the square before the corner is chamfered. The sixth width c2 may correspond to a length between chamfered corners facing each other among the chamfered corners. A distance between the chamfered corners facing each other may be greater than a distance between opposite sides among sides of the third opening 420*c*. That is, a length of a long axis may be greater than a length of the short axis. Since a corner of the third opening 420*c* is chamfered, an angle between the chamfered corner and the side of the third opening 420*c* may be an obtuse angle θ3.

In embodiments, the long axis of each of the first to third openings 420*a*, 420*b*, and 420*c* may be parallel to the column direction, e.g., the third and fourth directions D3 and D4, of the pixel regions 30 or the row direction, e.g., the first and second directions D1 and D2.

In embodiments, each of the first to third openings 420*a*, 420*b*, and 420*c* may include first to fourth sides. For example, the first and second sides may be parallel to each other, and the third and fourth sides may be parallel to each other. In addition, since each of the first to third openings 420*a*, 420*b*, and 420*c* has a plan shape of a square, a length of each of the sides of the first to third openings 420*a*, 420*b*, and 420*c* may be a substantially same. Further, a virtual line VL1 extending parallel to the first sides of the first and second openings 420*a* and 420*b* may be defined between the first side of the first opening 420*a* and the first side of the second opening 420*b* adjacent to the first side of the first opening 420*a*. For example, the first virtual line VL1 may be a line that connects points corresponding to half of a first distance d1 between the first sides.

A second virtual line VL2 connecting points that correspond to half of each of the first and second sides of the first opening 420*a* and the first and second sides of the second opening 420*b* may be defined. The second virtual line VL2 may be substantially perpendicular to the first virtual line VL1, and the first virtual line VL1 and the third opening 420*c* may overlap. For example, the first virtual line VL1 may connect portions that correspond to half of each of the first and second sides of the third opening 420*c*. Meanwhile, a distance from the third side of the first opening 420*a* (or the second opening 420*b*) to the first side of the third opening 420*c* may be defined as a second distance d2, and the first distance d1 and the second distance d2 may be a substantially same.

In embodiments, the fifth width c1 of the third opening 420*c* is less than the first width a1 and the third width b1 of the first opening 420*a* and the second opening 420*b*. Alternatively, a size of the first opening 420*a* may be different from a size of the second opening 420*b*.

The light blocking member 420 may block or absorb light incident from the outside. In addition, the light blocking member 420 may prevent a color mixture phenomenon that may occur in the optical filters 530. For example, when the light blocking member 420 is not formed, a part of light incident on the second optical filter 532 may be incident on the first optical filter 531, and the rest of the light may be incident on the third optical filter 533. In this case, the color mixture phenomenon may occur.

The light blocking member 420 may include an organic material such as a photoresist, a polyacryl-based resin, a polyimide-based resin, a polyamide-based resin, a siloxane-based resin, an acryl-based resin, and an epoxy-based resin. In addition, the light blocking member 420 may be substantially opaque. For example, the light blocking member 420 may further include a light blocking material to absorb the light. The light blocking material may include carbon black, titanium nitride oxide, titanium black, phenylene black, aniline black, cyanine black, nigrosine acid black, a black resin, and the like.

The first optical filter 531 may be disposed on a lower surface of the second protective insulating layer 490 and in the first opening 420*a* of the light blocking member 420. In other words, the first optical filter 531 may be disposed on the pixel structure 200 to overlap the first lower electrode 290_1 (or the first sub-pixel region 31). In embodiments, as illustrated in FIGS. 6 and 7, since the first optical filter 531 is disposed in the first opening 420*a* having a plan shape of a square including a chamfered corner, the first optical filter 531 may also have a plan shape of a square including a chamfered corner, and may be rotated at a predetermined angle, e.g., about 45 degrees, based on a center of the square. In addition, an area of the first optical filter 531 may be greater than an area of the third optical filter 533. Further, the first optical filter 531 may overlap the first color filter 511. The first optical filter 531 may be spaced apart from each of the second optical filter 532 and the third optical filter 533 by the light blocking part of the light blocking member 420. The first optical filter 531 may convert a blue color of light into a red color of light. For example, the first optical filter 531 may include a plurality of quantum dots configured to absorb a blue color of light and emit a red color of light.

The second optical filter 532 may be disposed on the lower surface of the second protective insulating layer 490 and in the second opening 420*b* of the light blocking member 420. In other words, the second optical filter 532 may be disposed on the pixel structure 200 to overlap the second lower electrode 290_2 (or the second sub-pixel region 32). In embodiments, as illustrated in FIGS. 6 and 7, since the second optical filter 532 is disposed in the second opening 420*b* having a plan shape of a square including a chamfered corner, the second optical filter 532 may also have a plan shape of a square including a chamfered corner, and may be rotated at a predetermined angle, e.g., about 45 degrees, based on a center of the square. In addition, an area of the second optical filter 532 may be greater than the area of the third optical filter 533. Further, the second optical filter 532 may overlap the second color filter 512. The second optical filter 532 may be spaced apart from each of the first optical filter 531 and the third optical filter 533 by the light blocking part of the light blocking member 420. The second optical filter 532 may convert a blue color of light into a green color of light. For example, the second optical filter 532 may include a plurality of quantum dots configured to absorb a blue color of light and emit a green color of light.

The quantum dots included in each of the first optical filter 531 and the second optical filter 532 may include one nanocrystal among a silicon Si-based nanocrystal, a group II-VI-based compound semiconductor nanocrystal, a group III-V-based compound semiconductor nanocrystal, a group IV-VI-based compound semiconductor nanocrystal, and a mixture thereof. The group II-VI-based compound semiconductor nanocrystal may be one selected from the group consisting of CdS, CdSe, CdTe, ZnS, ZnSe, ZnTe, HgS, HgSe, HgTe, CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HgZnTe, CdZnSeS, CdZnSeTe, CdZnSTe, CdHgSeS, CdHgSeTe, CdHgSTe, HgZnSeS, HgZnSeTe, and HgZnSTe. The group III-V-based compound semiconductor nanocrystal may be one selected from the group consisting of GaN, GaP, GaAs, AN, AlP, AlAs, InN, InP, InAs, GaNP, GaNAs, GaPAs, AlNP, AlNAs, AlPAs, InNP, InNAs, InPAs, GaAlNP, GaAlNAs, GaAlPAs, GaInNP, GaInNAs, GaInPAs, InAlNP, InAlNAs, and InAlPAs. The group IV-VI-based compound semiconductor nanocrystal may be SbTe.

Even when the quantum dots included in each of the first optical filter 531 and the second optical filter 532 include a same material, an emission wavelength may vary according to a size of the quantum dot. For example, as the size of the quantum dot decreases, light of a shorter wavelength may be emitted. Accordingly, light within a desired visible light region may be emitted by adjusting the size of the quantum dots included in each of the first optical filter 531 and the second optical filter 532.

In embodiments, the quantum dots included in the first optical filter 531 and the second optical filter 532 may be formed of a same material, and a size of the quantum dots included in the first optical filter 531 may be greater than a size of the quantum dots included in the second optical filter 532.

The first protective insulating layer 495 may be disposed under the first optical filter 531, the second optical filter 532, the light blocking member 420, and a part of the second protective insulating layer 490. In embodiments, the first protective insulating layer 495 may cover the first optical filter 531, the second optical filter 532, and the light blocking member 420 on a lower surface of the second protective insulating layer 490. In addition, the second protective insulating layer 490 and the first protective insulating layer 495 may be spaced apart from each other by each of the first optical filter 531 and the second optical filter 532. The second protective insulating layer 490 and the first protective insulating layer 495 may be in contact with each other through the third opening 420*c*. That is, the first protective insulating layer 495 may be disposed inside the third opening 420*c* so that the first protective insulating layer 495 may not be disposed on a lower surface of the third optical filter 533. The first protective insulating layer 495 may not be disposed inside the first opening 420*a* and inside the second opening 420*b* so that the first protective insulating layer 495 may not be disposed on an upper surface of each of the first optical filter 531 and the second optical filter 532. For example, the first protective insulating layer 495 may be disposed along a profile of the first optical filter 531, the second optical filter 532, and the light blocking member 420 with a uniform thickness to cover the first optical filter 531, the second optical filter 532, and the light blocking member 420 on the lower surface of the second protective insulating layer 490.

The first protective insulating layer 495 may include an inorganic insulating material or an organic insulating material. In embodiments, the first protective insulating layer 495 may include an inorganic insulating material such as silicon nitride. In other embodiments, the first protective insulating layer 495 may have a multilayer structure including a plurality of insulation layers. For example, the insulation layers may have mutually different thicknesses, or may include mutually different materials.

The third optical filter 533 may be disposed on a lower surface of the first protective insulating layer 495 and in the third opening 420*c* of the light blocking member 420. In other words, the third optical filter 533 may be disposed on the pixel structure 200 to overlap the third lower electrode 290_3, e.g., the third sub-pixel region 33. In embodiments, as illustrated in FIGS. 6 and 7, since the third optical filter 533 is disposed in the third opening 420*c* having a plan shape of a square including a chamfered corner, the third optical filter 533 may also have a plan shape of a square including a chamfered corner, and may be rotated at a predetermined angle, e.g., about 45 degrees, based on a center of the square. In addition, as described above, the area of the third optical filter 533 may be less than the area of each of the first and second optical filters 531 and 532. Further, the third optical filter 533 may overlap the third color filter 513. The third optical filter 533 may be spaced apart from each of the first optical filter 531 and the second optical filter 532 by the light blocking part of the light blocking member 420. The third optical filter 533 may transmit a blue color of light. For example, the third optical filter 533 may include a scattering material that intactly emits a blue color of light. That is, the third optical filter 533 may not include the quantum dots. Alternatively, each of the first optical filter 531 and the second optical filter 532 may further include the scattering material.

The third optical filter 533 may include TiO, ZrO, $AlO_3$, $In_2O_3$, ZnO, $SnO_2$, $Sb_2O_3$, ITO, and the like. However, a material of the third optical filter 533 may be variously modified into any material that scatters a blue color of light without converting the blue color of light.

Although the first optical filter 531, the second optical filter 532, and the third optical filter 533 according to the present inventive concept have been described as being sequentially configured, in an embodiment, the configuration of the first optical filter 531, the second optical filter 532, and the third optical filter 533 may be changed.

Accordingly, the optical filters 530 including the first optical filter 531, the second optical filter 532, and the third optical filter 533 may be disposed.

In embodiments, a shape of each of the first to third openings 420*a*, 420*b*, and 420*c* may be a substantially same as a shape of each of the first to third optical filter 531, 532, and 533. That is, a short axis of the first optical filter 531 may have the first width a1, and a long axis of the first optical filter 531 may have the second width a2. Here, the first width a1 may correspond to a length of a side of the square before the corner is chamfered. The second width a2 may correspond to a length between chamfered corners facing each other among the chamfered corners. In other words, a distance between the chamfered corners facing each other may be greater than a distance between opposite sides among sides of the first optical filter 531. That is, a length of a long axis may be greater than a length of the short axis. Since a corner of the first optical filter 531 is chamfered, an angle between the chamfered corner and the side of the first optical filter 531 may be the obtuse angle θ1.

In addition, a short axis of the second optical filter 532 may have the third width b1, and a long axis of the second optical filter 532 may have the fourth width b2 Here, the third width b1 may correspond to a length of a side of the square before the corner is chamfered. The fourth width b2 may correspond to a length between chamfered corners facing each other among the chamfered corners. A distance between the chamfered corners facing each other may be greater than a distance between opposite sides among sides of the second optical filter 532. That is, a length of a long axis may be greater than a length of the short axis. Since a corner of the second optical filter 532 is chamfered, an angle between the chamfered corner and the side of the second optical filter 532 may be the obtuse angle θ2.

Further, a short axis of the third optical filter 533 may have the fifth width c1, and a long axis of the third optical filter 533 may have the sixth width c2 Here, the fifth width c1 may correspond to a length of a side of the square before the corner is chamfered. The sixth width c2 may correspond to a length between chamfered corners facing each other among the chamfered corners. A distance between the chamfered corners facing each other may be greater than a distance between opposite sides among sides of the third optical filter 533. That is, a length of a long axis may be greater than a length of the short axis. Since a corner of the third optical filter 533 is chamfered, an angle between the chamfered corner and the side of the third optical filter 533 may be the obtuse angle θ3.

In embodiments, the long axis of each of the first to third openings 420*a*, 420*b*, and 420*c* may be parallel to the column direction, e.g., the third and fourth directions D3 and D4, of the pixel regions 30 or the row direction, e.g., the first and second directions D1 and D2.

In embodiments, each of the first to third optical filters 531, 532, and 533 may include first to fourth sides. For example, the first and second sides may be parallel to each other, and the third and fourth sides may be parallel to each other. In addition, since each of the first to third optical filters 531, 532, and 533 has a plan shape of a square, a length of each of the sides of the first to third optical filters 531, 532, and 533 may be a substantially same. Further, the virtual line VL1 extending parallel to the first sides of the first and second optical filters 531 and 532 may be defined between the first side of the first optical filter 531 and the first side of the second optical filter 532 adjacent to the first side of the first optical filter 531. For example, the first virtual line VL1 may be a line that connects points corresponding to half of the first distance d1 between the first sides. A second virtual line VL2 connecting points that correspond to half of each of the first and second sides of the first optical filter 531 and the first and second sides of the second optical filter 532 may be defined. The second virtual line VL2 may be substantially perpendicular to the first virtual line VL1, and the first virtual line VL1 and the third optical filter 533 may overlap. For example, the first virtual line VL1 may connect portions that correspond to half of each of the first and second sides of the third optical filter 533. Meanwhile, a distance from the third side of the first optical filter 531 (or the second optical filter 532) to the first side of the third optical filter 533 may be defined as the second distance d2, and the first distance d1 and the second distance d2 may be a substantially same.

In embodiments, the fifth width c1 of the third optical filter 533 is less than the first width a1 and the third width b1 of the first optical filter 531 and the second optical filter 532. Alternatively, a size of the first optical filter 531 may be different from a size of the second optical filter 532.

The intermediate layer 497 may be disposed under the first protective insulating layer 495 and the third optical filter 533. The intermediate layer 497 may be disposed on a lower surface of the first protective insulating layer 495 to cover the third optical filter 533. For example, the intermediate layer 497 may have a relatively thick thickness to sufficiently cover the third optical filter 533 on the lower surface of the first protective insulating layer 495. In other words, the intermediate layer 497 may be disposed on the thin film encapsulation structure 450. The intermediate layer 497 may include an organic insulating material, an inorganic insulating material, or the like.

A sealing member may be disposed in the peripheral region 20 between the first substrate 110 and the second substrate 410. For example, the sealing member may substantially surround the display region 10. The sealing member may be in contact with a lower surface of the second substrate 410 and an upper surface of the first substrate 110. Alternatively, at least one insulation layer, e.g., the gate insulation layer 150, the insulating interlayer 190, the first inorganic thin film encapsulation layer 451, the second inorganic thin film encapsulation layer 453, etc., may be interposed between a lower surface of the sealing member and the upper surface of the first substrate 110.

In embodiments, the sealing member may include a non-conductive material. For example, the sealing member may include a frit or the like. In addition, the sealing member may additionally include a photocurable material. For example, the sealing member may include a mixture of an organic material and a photocurable material, and the mixture may be irradiated with ultraviolet (UV) rays, laser light, visible light, or the like so as to be cured so that the sealing member may be obtained. The photocurable material included in the sealing member may include an epoxy acrylate-based resin, a polyester acrylate-based resin, a urethane acrylate-based resin, a polybutadiene acrylate-based resin, a silicon acrylate-based resin, an alkyl acrylate-based resin, and the like.

For example, laser light may be irradiated onto the mixture of the organic material and the photocurable material. As the laser light is irradiated, the mixture may be changed from a solid state to a liquid state, and the mixture in the liquid state may be cured into the solid state after a predetermined time. The second substrate 410 may be coupled to the first substrate 110 while being sealed with respect to the first substrate 110 according to the state change of the mixture.

Accordingly, the upper structure 600 including the second protective insulating layer 490, the first protective insulating layer 495, the optical filters 530, the intermediate layer 497, the color filters 510, the light blocking member 420, and the second substrate 410 may be provided. The display device 100 including the lower structure 500 and the upper structure 600 illustrated in FIG. 8 may be provided.

However, although the display device 100 according to the present inventive concept has been described as specifically being an organic light emitting display device, in an embodiment, the display device 100 may include a liquid crystal display device (LCD), a field emission display device (FED), a plasma display device (PDP), and an electrophoretic display device (EPD). For example, the second substrate 410 on which the optical filters 530, the color filters 510, and the like are disposed may be used as a second substrate of each of the liquid crystal display device, the field emission display device, the plasma display device, and the electrophoretic display device.

Figure 26:
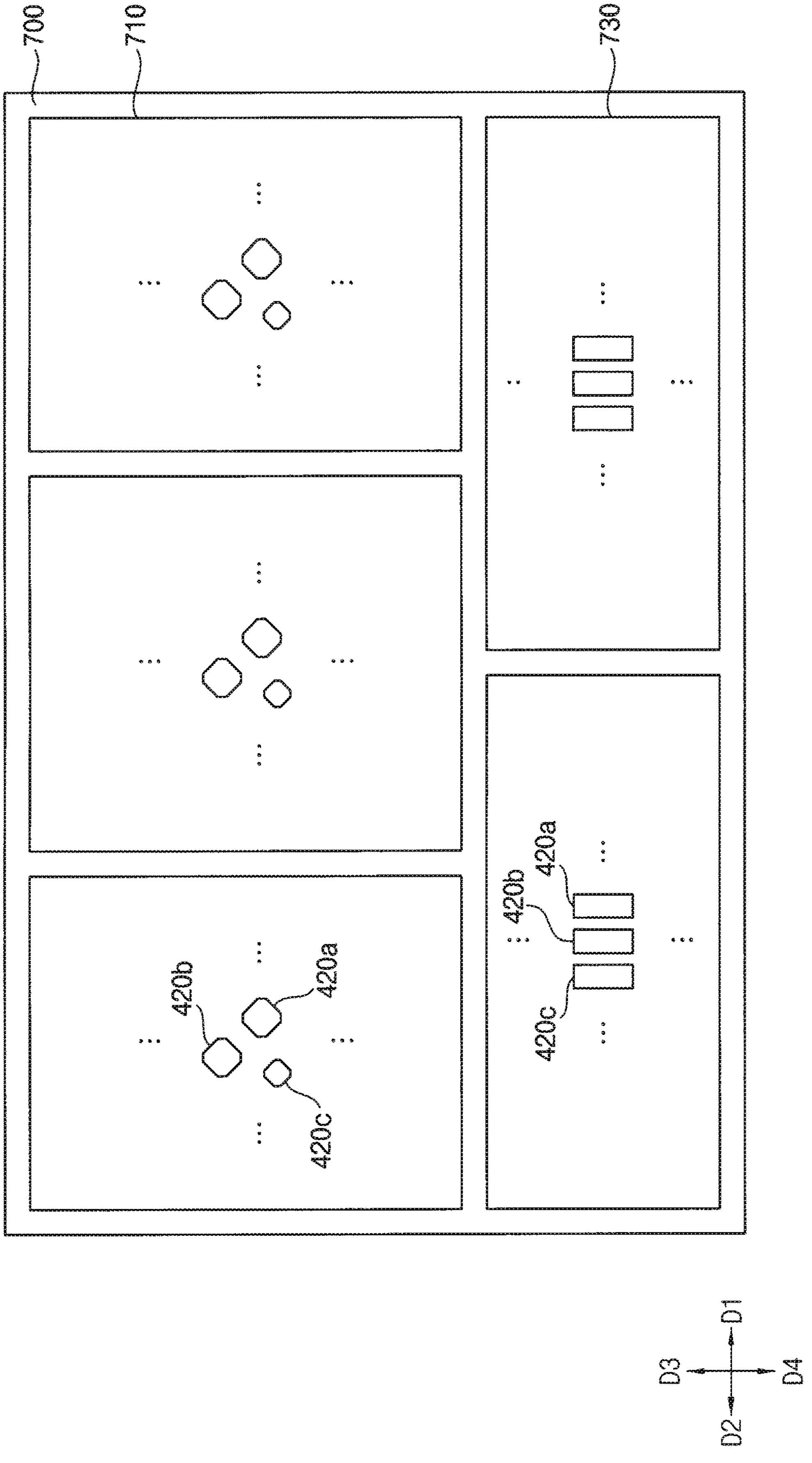
FIG. 26 is a plan view illustrating an example of the mother substrate of FIG. 25.
Figure 27:
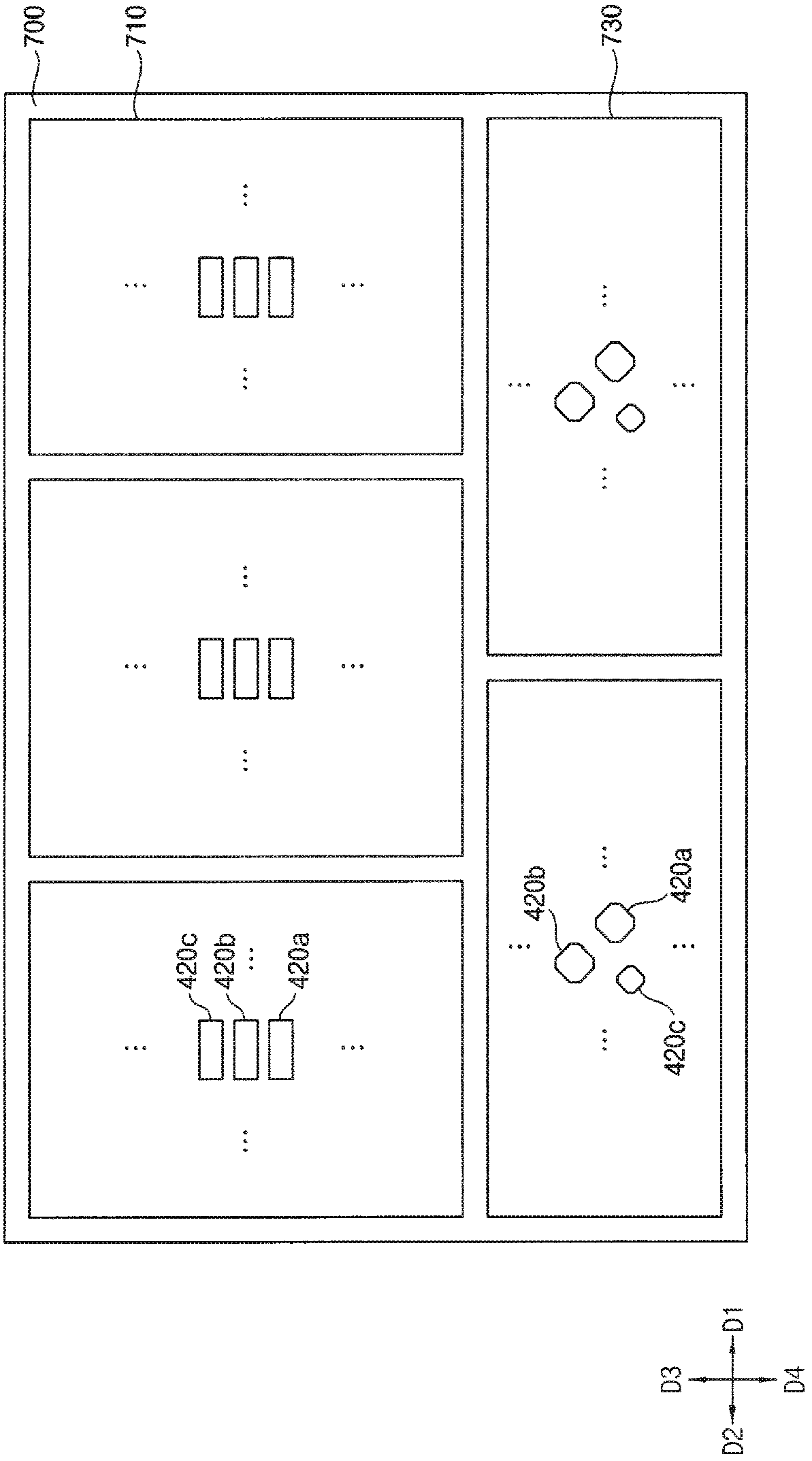
FIG. 27 is a plan view illustrating another example of the mother substrate of FIG. 25.
Figure 28:
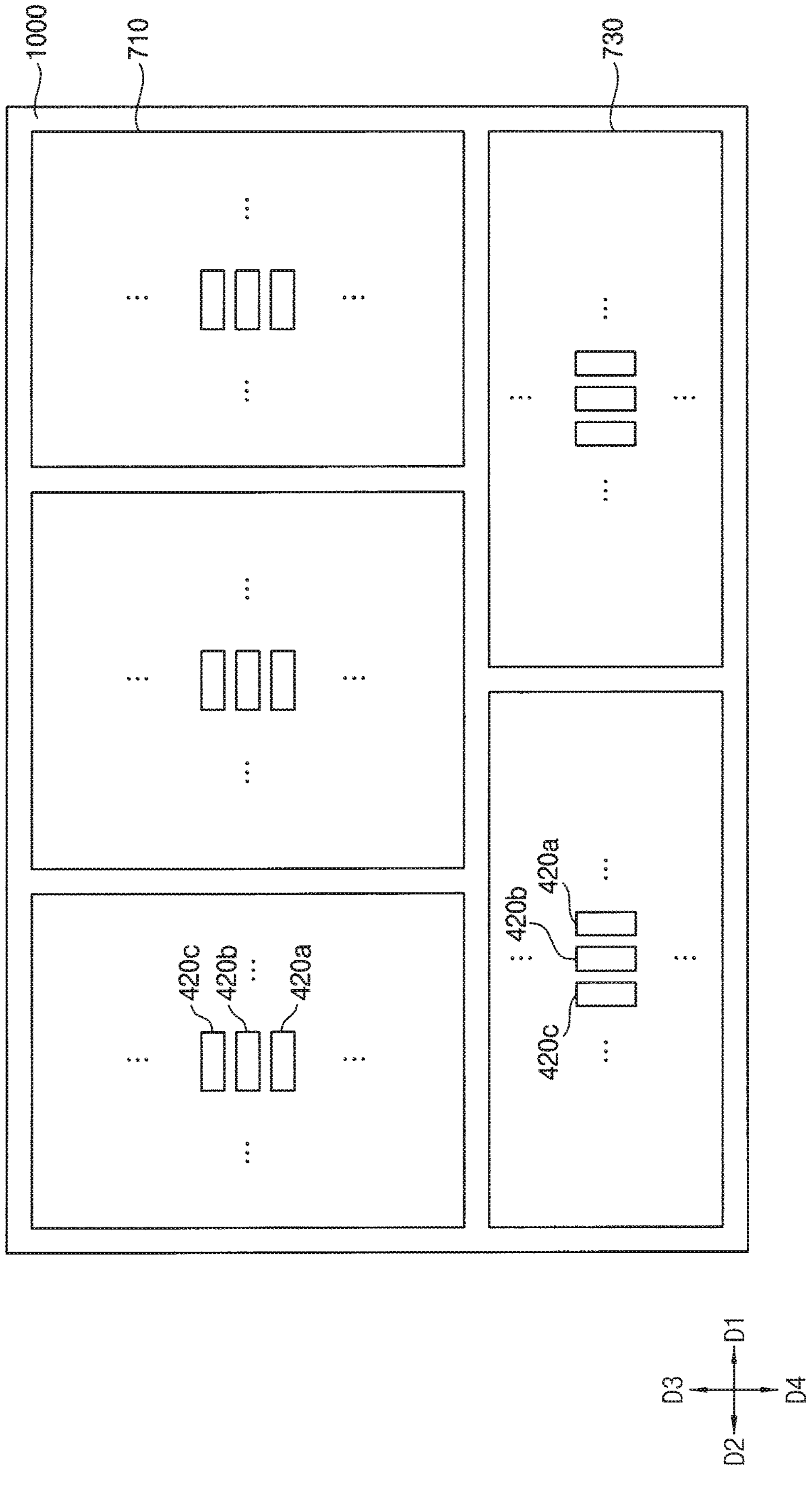
FIG. 28 is a plan view illustrating a comparative example of the mother substrate of FIGS. 25, 26, and 27.

For example, in a method of a conventional display device, a mother substrate may include second substrates of different sizes provided in panels of different sizes, e.g., refer to FIGS. 26 to 28. A color filter may be formed on a lower surface of the mother substrate, and a light blocking member having a plurality of openings may be formed on a lower surface of the color filter. Each of the openings may have a plan shape of a rectangle, and quantum dot layers may be formed in the openings by an inkjet process. When the quantum dot layer is formed in the opening having a plan shape of a rectangle by an inkjet process, a configuration direction of the second substrates is different, and the inkjet process may not be simultaneously performed in the second substrates of different sizes because a direction of a long axis of the opening may be different. Thus, a time of the inkjet process may be greatly increased, e.g., 514 seconds/mother substrate.

In order to solve the problem, the light blocking member was manufactured so that each of the openings has a plan shape of a square. When the quantum dot layer is formed in the opening having a plan shape of a square by an inkjet process, the inkjet process may be simultaneously performed on the second substrates having different sizes. However, since an impact section of an ink is relatively shorter than an impact section of an ink of an opening having a plan shape of a rectangle, a precise process is required. Therefore, a time of the inkjet process was not relatively significantly decreased, e.g., 452 seconds/mother substrate. In addition, since angles of corners of a square are at right angles, there was a problem that the ink is not filled at the corners.

In the display device 100 according to the embodiments of the present inventive concept, as each of the first to third openings 420*a*, 420*b*, and 420*c* of the light blocking member 420 has a plan shape of a square rotated about 45 degrees, an impact section of an ink may be relatively long. For example, when a side length of a square is 1 and an inkjet process is performed in a first direction D1, an impact section of an ink in the opening having a plan shape of a square is 1. Meanwhile, an impact section of an ink in the opening having a plan shape of a square rotated about 45 degrees is about 1.4142 (e.g., square root of 2). That is, when the inkjet process is performed in the first direction D1, the impact section of the opening having the plan shape of the square rotated about 45 degrees may be relatively long. Here, the impact section of the ink is defined as a distance where the ink is ejected in the opening. Accordingly, the inkjet process may be simultaneously performed in the mother substrate including the second substrates of different sizes, and a time of the inkjet process may be significantly reduced due to a relatively long impact section of an ink, e.g., 294 seconds/mother substrate.

In addition, each of the first to third openings 420*a*, 420*b*, and 420*c* has chamfered corners, so that the ink may be easily filled at the corners. Accordingly, the display device 100 may prevent a defect in which the ink is not filled at the corners.

Further, since the first to third openings 420*a*, 420*b*, and 420*c* are configured in a "T" shape rotated by about 45 degrees, the display device 100 may secure a relatively high aperture ratio.

FIGS. 9, 10, 11, 12, 13, 14, 15, 16, 17, 18, 19, and 20 are cross-sectional views illustrating a method of manufacturing a display device according to embodiments of the present inventive concept.

Figure 9:
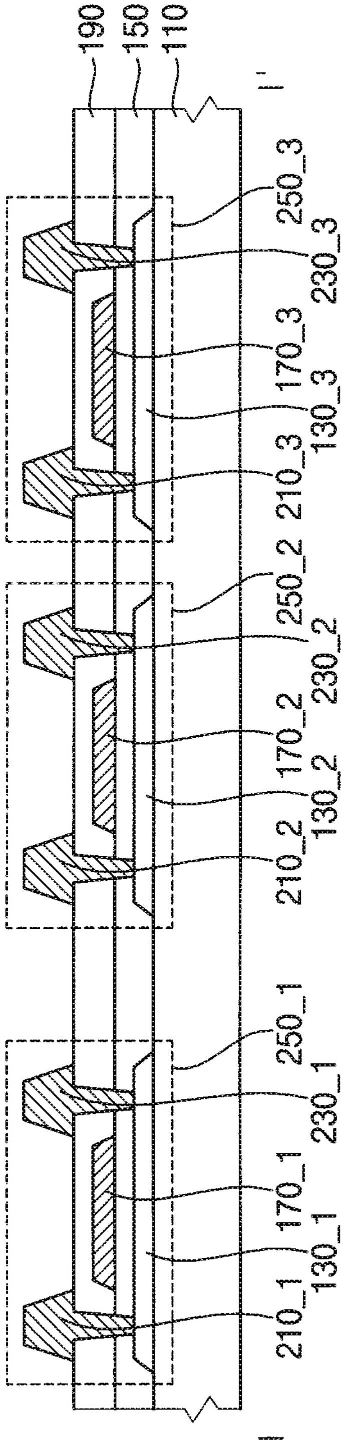
FIGS. 9, 10, 11, 12, 13, 14, 15, 16, 17, 18, 19, and 20 are cross-sectional views illustrating a method of manufacturing a display device according to embodiments of the present inventive concept.

Referring to FIG. 9, a first substrate 110 including a transparent or opaque material may be provided. The first substrate 110 may be formed by using a quartz substrate, a synthetic quartz substrate, a calcium fluoride substrate, a fluorine-doped quartz substrate, a soda lime glass substrate, a non-alkali glass substrate, and the like.

Alternatively, the first substrate 110 may be configured as a transparent resin substrate having flexibility. Examples of the transparent resin substrate that may be used as the first substrate 110 may include a polyimide substrate. In this case, the polyimide substrate may include a first polyimide layer, a barrier film layer, a second polyimide layer, and the like. For example, the polyimide substrate may have a configuration in which the first polyimide layer, the barrier film layer, and the second polyimide layer are sequentially stacked on a rigid glass substrate. In a method of manufacturing a display device, after forming an insulation layer, e.g., a buffer layer, on the second polyimide layer of the polyimide substrate, semiconductor elements, sub-pixel structures, and the like may be formed on the insulation layer. After the semiconductor elements and the sub-pixel structure are formed, the rigid glass substrate may be removed. That is, since the polyimide substrate is thin and flexible, it may be difficult to directly form the semiconductor elements and the sub-pixel structure on the polyimide substrate. In consideration of this point, after the semiconductor elements and the sub-pixel structure are formed by using the rigid glass substrate, the glass substrate may be removed, so that the polyimide substrate may be used as the first substrate 110.

A buffer layer may be formed on the first substrate 110. The buffer layer may be formed on the entire first substrate 110. Depending on a type of the first substrate 110, at least two buffer layers may be provided on the first substrate 110, or the buffer layer may not be formed. For example, the buffer layer may be formed by using an organic material or an inorganic material.

First to third active layers 130_1, 130_2, and 130_3 may be formed on the first substrate 110 while being spaced apart from each other. Each of the first to third active layers 130_1, 130_2, and 130_3 may be formed by using an oxide semiconductor, an inorganic semiconductor, an organic semiconductor, or the like, and may include a source region and a drain region. In other words, the first to third active layers 130_1, 130_2, and 130_3 may be simultaneously formed on a same layer by using a same material.

A gate insulation layer 150 may be formed on the first to third active layers 130_1, 130_2, and 130_3. The gate insulation layer 150 may cover the first to third active layers 130_1, 130_2, and 130_3 on the first substrate 110, and may be formed on the entire first substrate 110. For example, the gate insulation layer 150 may sufficiently cover the first to third active layers 130_1, 130_2, and 130_3 on the first substrate 110, and may have a substantially flat upper surface without creating a step around the first to third active layers 130_1, 130_2, and 130_3. Alternatively, the gate insulation layer 150 may be formed along a profile of the first to third active layers 130_1, 130_2, and 130_3 with a uniform thickness to cover the first to third active layers 130_1, 130_2, and 130_3 on the first substrate 110. The gate insulation layer 150 may be formed by using a silicon compound, metal oxide, or the like. For example, the gate insulation layer 150 may include $SiO_x$, $SiN_x$, $SiO_xN_y$, $SiO_xC_y$, $SiC_xN_y$, $AlO_x$, $AlN_x$, $TaO_x$, $HfO_x$, $ZrO_x$, $TiO_x$, and the like.

First to third gate electrodes 170_1, 170_2, and 170_3 may be formed on the gate insulation layer 150 while being spaced apart from each other. For example, the first gate electrode 170_1 may be formed on a portion of the gate insulation layer 150 under which the first active layer 130_1 is located, the second gate electrode 170_2 may be formed on a portion of the gate insulation layer 150 under which the second active layer 130_2 is located, and the third gate electrode 170_3 may be formed on a portion of the gate insulation layer 150 under which the third active layer 130_3 is located. Each of the first to third gate electrodes 170_1, 170_2, and 170_3 may be formed by using a metal, an alloy, metal nitride, conductive metal oxide, a transparent conductive material, and the like. These may be used alone or in combination with each other. In other words, the first to third gate electrodes 170_1, 170_2, and 170_3 may be simultaneously formed on a same layer by using a same material.

An insulating interlayer 190 may be formed on the first to third gate electrodes 170_1, 170_2, and 170_3. The insulating interlayer 190 may cover the first to third gate electrodes 170_1, 170_2, and 170_3 on the gate insulation layer 150, and may be formed on the entire gate insulation layer 150. For example, the insulating interlayer 190 may sufficiently cover the first to third gate electrodes 170_1, 170_2, and 170_3 on the gate insulation layer 150, and may have a substantially flat upper surface without creating a step around the first to third gate electrodes 170_1, 170_2, and 170_3. Alternatively, the insulating interlayer 190 may be formed along a profile of the first to third gate electrodes 170_1, 170_2, and 170_3 with a uniform thickness to cover the first to third gate electrodes 170_1, 170_2, and 170_3 on the gate insulation layer 150. The insulating interlayer 190 may be formed by using a silicon compound, metal oxide, or the like.

A first source electrode 210_1, a first drain electrode 230_1, a second source electrode 210_2, a second drain electrode 230_2, a third source electrode 210_3, and a third drain electrode 230_3 may be formed on the insulating interlayer 190 while being spaced apart from each other. For example, the first source electrode 210_1 may be connected to the source region of the first active layer 130_1 through a contact hole formed by removing first portions of the gate insulation layer 150 and the insulating interlayer 190. The first drain electrode 230_1 may be connected to the drain region of the first active layer 130_1 through a contact hole formed by removing second portions of the gate insulation layer 150 and the insulating interlayer 190. In addition, the second source electrode 210_2 may be connected to the source region of the second active layer 130_2 through a contact hole formed by removing third portions of the gate insulation layer 150 and the insulating interlayer 190. The second drain electrode 230_2 may be connected to the drain region of the second active layer 130_2 through a contact hole formed by removing fourth portions of the gate insulation layer 150 and the insulating interlayer 190. Further, the third source electrode 210_3 may be connected to the source region of the third active layer 130_3 through a contact hole formed by removing fifth portions of the gate insulation layer 150 and the insulating interlayer 190. The third drain electrode 230_3 may be connected to the drain region of the third active layer 130_3 through a contact hole formed by removing sixth portions of the gate insulation layer 150 and the insulating interlayer 190.

Each of the first to third source electrodes 210_1, 210_2, and 210_3 and the first to third drain electrodes 230_1, 230_2, and 230_3 may be formed by using a metal, an alloy, metal nitride, conductive metal oxide, a transparent conductive material, and the like. These may be used alone or in combination with each other. In other words, the first to third source electrodes 210_1, 210_2, and 210_3 and the first to third drain electrodes 230_1, 230_2, and 230_3 may be simultaneously formed on a same layer by using a same material.

Accordingly, a first semiconductor element 250_1 including the first active layer 130_1, the first gate electrode 170_1, the first source electrode 210_1, and the first drain electrode 230_1 may be formed. A second semiconductor element 250_2 including the second active layer 130_2, the second gate electrode 170_2, the second source electrode 210_2, and the second drain electrode 230_2 may be formed. A third semiconductor element 250_3 including the third active layer 130_3, the third gate electrode 170_3, the third source electrode 210_3, and the third drain electrode 230_3 may be formed.

Figure 10:
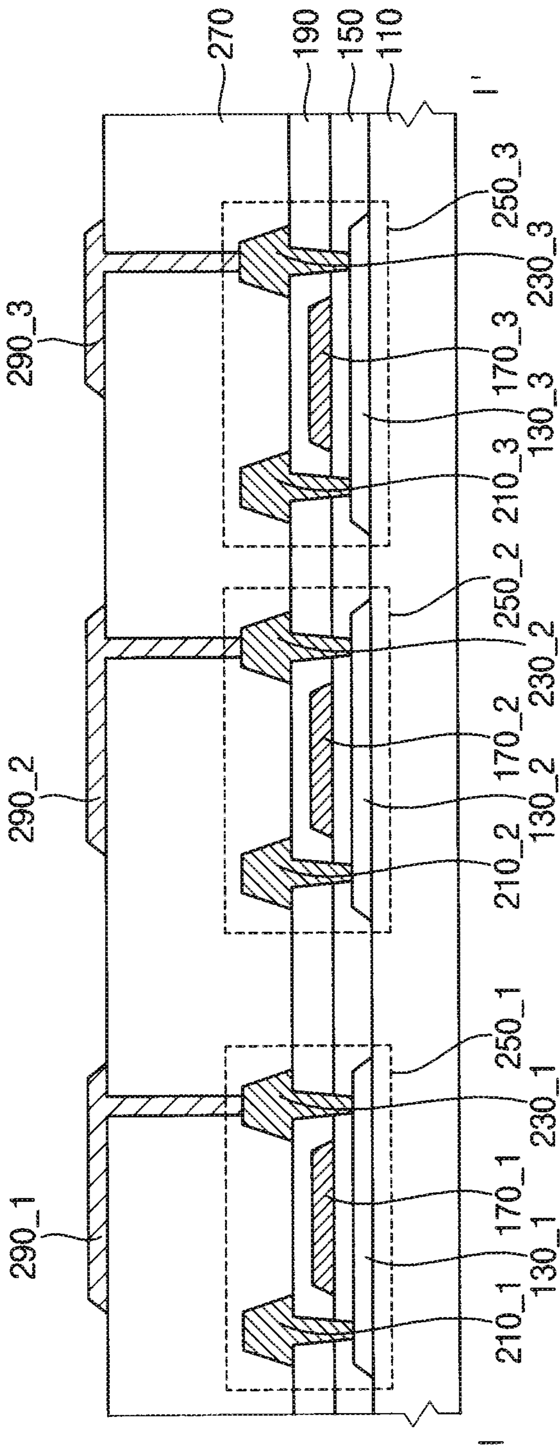

Referring to FIG. 10, a planarization layer 270 may be formed on the insulating interlayer 190 and the first to third semiconductor elements 250_1, 250_2, and 250_3. For example, the planarization layer 270 may have a relatively thick thickness to sufficiently cover the first to third source electrodes 210_1, 210_2, and 210_3 and the first to third drain electrodes 230_1, 230_2, and 230_3 on the insulating interlayer 190. In this case, the planarization layer 270 may have a substantially flat upper surface. In order to implement such a flat upper surface of the planarization layer 270, a planarization process may be additionally performed on the planarization layer 270. The planarization layer 270 may be formed by using an organic material.

A first to third lower electrodes 290_1, 290_2, and 290_3 may be formed on the planarization layer 270 while being spaced apart from each other. In embodiments, as illustrated in FIGS. 3 and 4, each of the first to third lower electrodes 290_1, 290_2, and 290_3 may have a plan shape of a square including a chamfered corner, and may have a plan shape of a square rotated by about 45 degrees. In addition, when viewed in a plan view of a display device 100, an area of each of the first and second lower electrodes 290_1 and 290_2 may be greater than an area of the third lower electrode 290_3. Each of the first to third lower electrodes 290_1, 290_2, and 290_3 may pass through the planarization layer 270 so as to be connected to the first to third drain electrodes 230_1, 230_2, and 230_3, respectively.

Each of the first to third lower electrodes 290_1, 290_2, and 290_3 may include a metal, an alloy, metal nitride, conductive metal oxide, a transparent conductive material, and the like. For example, each of the first to third lower electrodes 290_1, 290_2, and 290_3 may include Au, Ag, Al, Pt, Ni, Ti, Pd, Mg, Ca, Li, Cr, Ta, W, Cu, Mo, Sc, Nd, Jr, an aluminum-containing alloy, $AlN_x$, a silver-containing alloy, $WN_x$, a copper-containing alloy, a molybdenum-containing alloy, $TiN_x$, $CrN_x$, $TaN_x$, $SrRu_xO_y$, $ZnO_x$, ITO, $SnO_x$, $InO_x$, $GaO_x$, IZO, and the like. These may be used alone or in combination with each other. In other words, the first to third lower electrodes 290_1, 290_2, and 290_3 may be simultaneously formed on a same layer by using a same material.

Referring to FIGS. 3, 4, and 11, a pixel defining layer 310 may be formed on the planarization layer 270 and a part of each of the first to third lower electrodes 290_1, 290_2, and 290_3. The pixel defining layer 310 may cover both side portions, e.g., an outer periphery, of each of the first to third lower electrodes 290_1, 290_2, and 290_3, and may expose a part of an upper surface of each of the first to third lower electrodes 290_1, 290_2, and 290_3. In other words, the pixel defining layer 310 may be formed with a first opening 310*a*, a second opening 310*b*, and a third opening 310*c*, which expose the parts of the upper surfaces of the first to third lower electrodes 290_1, 290_2, and 290_3, respectively. In embodiments, as illustrated in FIG. 3, the first to third openings 310*a*, 310*b*, and 310*c* may have a plan shape of a square including a chamfered corner, and may have a plan shape of a square rotated by about 45 degrees. In addition, an area of each of the first and second openings 310*a* and 310*b* may be greater than an area of the third opening 310*c*. The pixel defining layer 310 may be formed by using an organic insulating material. For example, the pixel defining layer 310 may include a photoresist, a polyacryl-based resin, a polyimide-based resin, a polyamide-based resin, a siloxane-based resin, an acryl-based resin, an epoxy-based resin, and the like.

Figure 12:
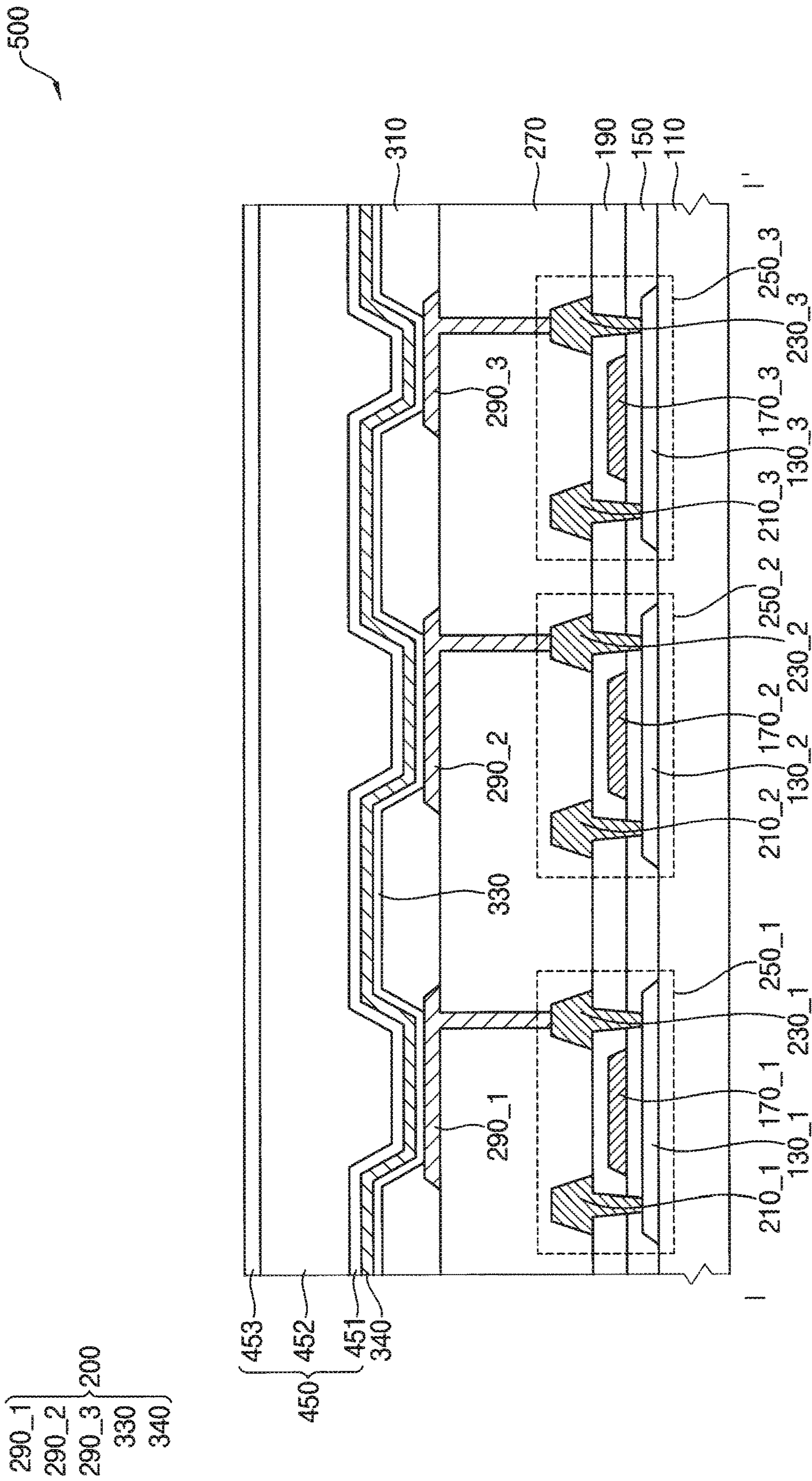

Referring to FIG. 12, a light emitting layer 330 may be formed on the first to third lower electrodes 290_1, 290_2, and 290_3 exposed by the pixel defining layer 310. In other words, the light emitting layer 330 may be continuously (or integrally) formed on the first substrate 110. In embodiments, the light emitting layer 330 may be formed by using a light emitting material for emitting a blue color of light. Otherwise, the light emitting layer 330 may be formed by stacking a plurality of light emitting materials for generating different color lights such as a red color of light, a green color of light, and a blue color of light to emit a white color of light as a whole.

An upper electrode 340 may be formed in the display region 10 on the pixel defining layer 310 and the light emitting layer 330. The upper electrode 340 may be formed by using a metal, an alloy, metal nitride, conductive metal oxide, a transparent conductive material, and the like. These may be used alone or in combination with each other.

Accordingly, a first sub-pixel structure including the first lower electrode 290_1, the light emitting layer 330, and the upper electrode 340 may be formed, a second sub-pixel structure including the second lower electrode 290_2, the light emitting layer 330, and the upper electrode 340 may be formed, and a third sub-pixel structure including the third lower electrode 290_3, the light emitting layer 330, and the upper electrode 340 may be formed. That is, a pixel structure 200 including the first lower electrode 290_1, the second lower electrode 290_2, the third lower electrode 290_3, the light emitting layer 330, and the upper electrode 340 may be formed.

A first inorganic thin film encapsulation layer 451 may be formed on the upper electrode 340. The first inorganic thin film encapsulation layer 451 may be formed along a profile of the upper electrode 340 with a uniform thickness to cover the upper electrode 340. The first inorganic thin film encapsulation layer 451 may be formed by using an inorganic insulating material having flexibility.

An organic thin film encapsulation layer 452 may be formed on the first inorganic thin film encapsulation layer 451. The organic thin film encapsulation layer 452 may be formed by using an organic insulating material having flexibility.

A second inorganic thin film encapsulation layer 453 may be formed on the organic thin film encapsulation layer 452. The second inorganic thin film encapsulation layer 453 may be formed along a profile of the organic thin film encapsulation layer 452 with a uniform thickness to cover the organic thin film encapsulation layer 452. The second inorganic thin film encapsulation layer 453 may be formed by using the inorganic insulating material having flexibility.

Accordingly, a thin film encapsulation structure 450 including the first inorganic thin film encapsulation layer 451, the organic thin film encapsulation layer 452, and the second inorganic thin film encapsulation layer 453 may be formed. A lower structure 500 including the first substrate 110, the first semiconductor element 250_1, the second semiconductor element 250_2, the third semiconductor element 250_3, the gate insulation layer 150, the insulating interlayer 190, the planarization layer 270, the pixel structure 200, the pixel defining layer 310, and the thin film encapsulation structure 450 may be provided.

Referring to FIG. 13, a second substrate 410 may be provided. The second substrate 410 and the first substrate 110 may include a substantially same material. For example, the second substrate 410 may be formed by using a quartz substrate, a synthetic quartz substrate, a calcium fluoride substrate, a fluorine-doped quartz substrate, a soda lime glass substrate, a non-alkali glass substrate, and the like.

A third color filter 513 may be formed on a lower surface of the second substrate 410. The third color filter 513 may have openings 513*a* and 513*b*. In embodiments, the third color filter 513 may transmit a blue color of light, and may be a color filter having a blue color.

Referring to FIG. 14, a first color filter 511 may be formed under the third color filter 513 and the lower surface of the second substrate 410. The first color filter 511 may have openings 511*a* and 511*b*. In embodiments, the first color filter 511 may transmit a red color of light, and may be a color filter having a red color.

Referring to FIG. 15, a second color filter 512 may be formed under the first color filter 511 and the lower surface of the second substrate 410. The second color filter 512 may be formed in the opening 511*a* of the first color filter 511, and may have a first opening that exposes the opening 511*b* of the first color filter 511 and a second opening that exposes a part of a lower surface of the first color filter 511 under the first color filter 511. In embodiments, the second color filter 512 may transmit a green color of light, and may be a color filter having a green color.

Accordingly, a color filter 510 including the first color filter 511, the second color filter 512, and the third color filter 513 may be formed. The second opening of the second color filter 512 is defined as a first opening 510*a* of the color filters 510, a portion in which the second color filter 512 is formed is defined as a second opening 510*b* of the color filters 510, and the opening 511*b* of the first color filter 511 and the first opening of the second color filter 512 is defined as a third opening 510*c* of the color filters 510. The color filters 510 may be formed by using a photosensitive resin or a color photoresist.

Referring to FIGS. 5 and 16, a second protective insulating layer 490 may be formed under the color filters 510. The second protective insulating layer 490 may cover the color filters 510 on the lower surface of the second substrate 410. For example, the second protective insulating layer 490 may be formed along a profile of the color filters 510 with a uniform thickness to cover the color filters 510 on the lower surface of the second substrate 410. Alternatively, the second protective insulating layer 490 may sufficiently cover the color filters 510 on the lower surface of the second substrate 410, and may have a substantially flat upper surface without creating a step around the color filters 510.

The second protective insulating layer 490 may be formed by using an inorganic insulating material such as silicon nitride.

A light blocking member 420 may be formed on a lower surface of the second protective insulating layer 490. The light blocking member 420 may have a first opening 420*a*, a second opening 420*b*, and a third opening 420*c*. In embodiments, as illustrated in FIG. 5, the first to third openings 420*a*, 420*b*, and 420*c* may have a plan shape of a square including a chamfered corner, and may have a plan shape of a square rotated by about 45 degrees. In addition, an area of each of the first and second openings 420*a* and 420*b* may be greater than an area of the third opening 420*c*. For example, the light blocking member 420 may have a plate shape including the first to third openings 420*a*, 420*b*, and 420*c*. In addition, the first opening 510*a*, the second opening 510*b*, and the third opening 510*c* of the color filters 510 may overlap the first opening 420*a*, the second opening 420*b*, and the third opening 420*c* of the light blocking member 420, respectively.

The light blocking member 420 may be formed by using an organic material such as a photoresist, a polyacryl-based resin, a polyimide-based resin, a polyamide-based resin, a siloxane-based resin, an acryl-based resin, and an epoxy-based resin. In addition, the light blocking member 420 may be substantially opaque. For example, the light blocking member 420 may further include a light blocking material to absorb the light. The light blocking material may include carbon black, titanium nitride oxide, titanium black, phenylene black, aniline black, cyanine black, nigrosine acid black, a black resin, and the like.

Figure 17:
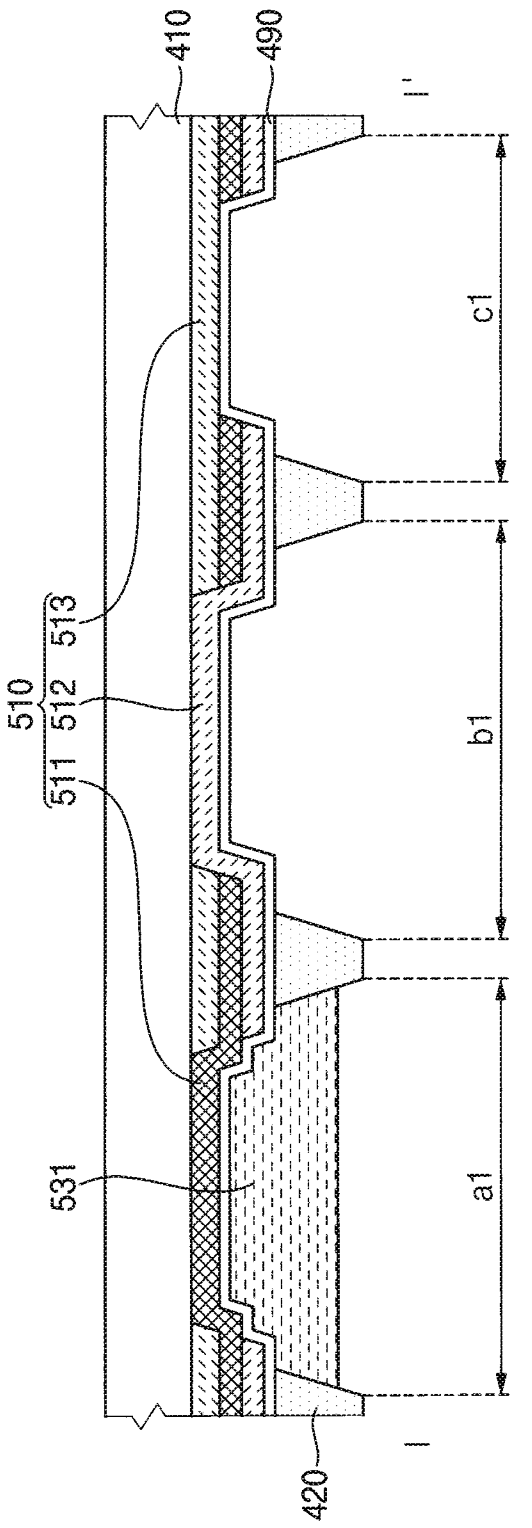

Referring to FIG. 17, a first optical filter 531 may be formed on a lower surface of the second protective insulating layer 490 and in the first opening 420*a* of the light blocking member 420. In embodiments, as illustrated in FIG. 7, since the first optical filter 531 is formed in the first opening 420*a* having a plan shape of a square including a chamfered corner, the first optical filter 531 may also have a plan shape of a square including a chamfered corner, and may be rotated at about 45 degrees based on a center of the square. In addition, the first optical filter 531 may overlap the first color filter 511. The first optical filter 531 may convert a blue color of light into a red color of light. For example, the first optical filter 531 may include a plurality of quantum dots configured to absorb a blue color of light and emit a red color of light. In embodiments, the first optical filter 531 may be formed by using an inkjet process.

Figure 18:
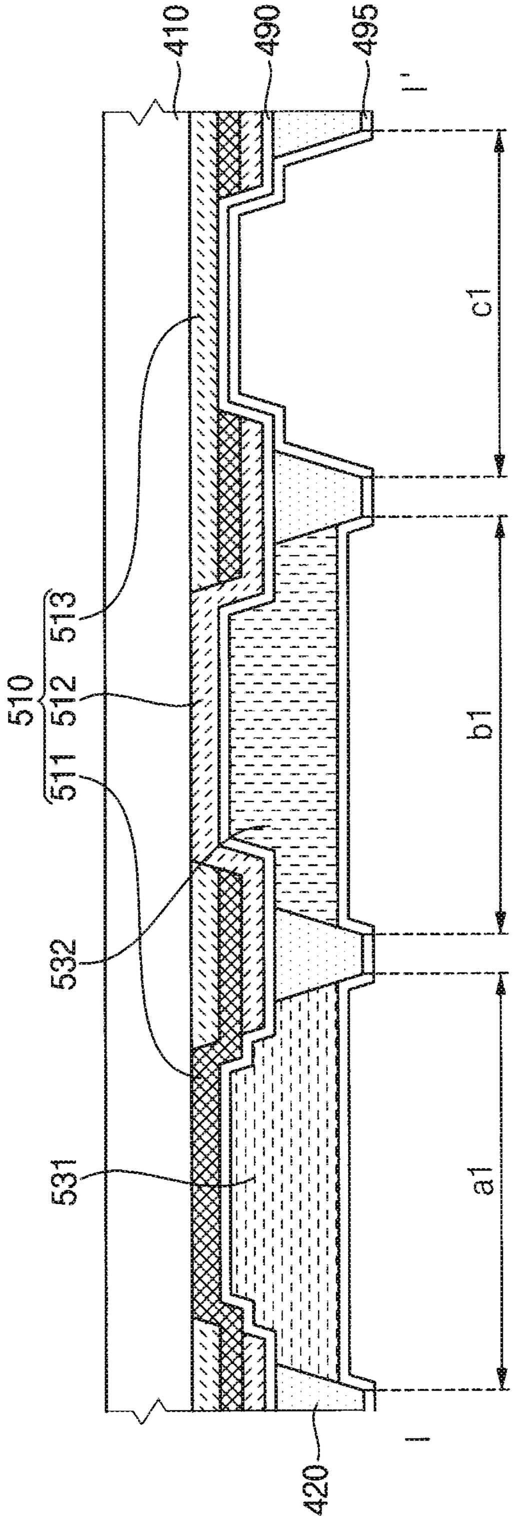

Referring to FIG. 18, the second optical filter 532 may be formed on the lower surface of the second protective insulating layer 490 and in the second opening 420*b* of the light blocking member 420. In embodiments, as illustrated in FIG. 7, since the second optical filter 532 is formed in the second opening 420*b* having a plan shape of a square including a chamfered corner, the second optical filter 532 may also have a plan shape of a square including a chamfered corner, and may be rotated at about 45 degrees based on a center of the square. In addition, the second optical filter 532 may overlap the second color filter 512. The second optical filter 532 may convert a blue color of light into a green color of light. For example, the second optical filter 532 may include a plurality of quantum dots configured to absorb a blue color of light and emit a green color of light.

The quantum dots included in each of the first optical filter 531 and the second optical filter 532 may be formed by using one nanocrystal among a silicon Si-based nanocrystal, a group II-VI-based compound semiconductor nanocrystal, a group III-V-based compound semiconductor nanocrystal, a group IV-VI-based compound semiconductor nanocrystal, and a mixture thereof.

A first protective insulating layer 495 may be formed under the first optical filter 531, the second optical filter 532, the light blocking member 420, and a part of the second protective insulating layer 490. In embodiments, the first protective insulating layer 495 may cover the first optical filter 531, the second optical filter 532, and the light blocking member 420 on a lower surface of the second protective insulating layer 490. In addition, the second protective insulating layer 490 and the first protective insulating layer 495 may be spaced apart from each other by each of the first optical filter 531 and the second optical filter 532. The second protective insulating layer 490 and the first protective insulating layer 495 may be in contact with each other through the third opening 420*c*. For example, the first protective insulating layer 495 may be formed along a profile of the first optical filter 531, the second optical filter 532, and the light blocking member 420 with a uniform thickness to cover the first optical filter 531, the second optical filter 532, and the light blocking member 420 on the lower surface of the second protective insulating layer 490. The first protective insulating layer 495 may be formed by using an inorganic insulating material such as silicon nitride.

Figure 19:
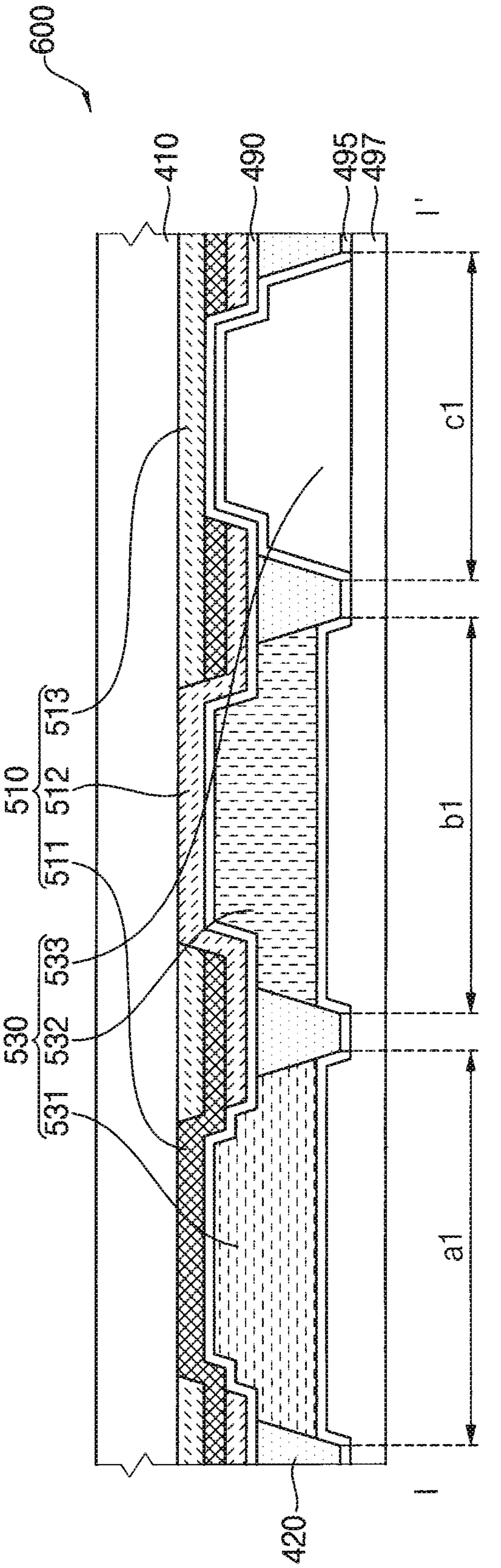

Referring to FIG. 19, a third optical filter 533 may be formed on a lower surface of the first protective insulating layer 495 and in the third opening 420*c* of the light blocking member 420. In embodiments, as illustrated in FIG. 7, since the third optical filter 533 is formed in the third opening 420*c* having a plan shape of a square including a chamfered corner, the third optical filter 533 may also have a plan shape of a square including a chamfered corner, and may be rotated at about 45 degrees based on a center of the square. In addition, an area of the third optical filter 533 may be less than an area of each of the first and second optical filters 531 and 532. Further, the third optical filter 533 may overlap the third color filter 513. The third optical filter 533 may be spaced apart from each of the first optical filter 531 and the second optical filter 532 by the light blocking member 420. The third optical filter 533 may transmit a blue color of light. For example, the third optical filter 533 may include a scattering material that intactly emits a blue color of light. That is, the third optical filter 533 may not include the quantum dots. In embodiments, the third optical filter 533 may be formed by using an inkjet process.

The third optical filter 533 may be formed by using TiO, ZrO, $AlO_3$, $In_2O_3$, ZnO, $SnO_2$, $Sb_2O_3$, ITO, and the like. However, a material of the third optical filter 533 may be variously modified into any material that scatters blue light without converting the blue light.

Accordingly, optical filter 530 including the first optical filter 531, the second optical filter 532, and the third optical filter 533 may be formed.

An intermediate layer 497 may be formed under the first protective insulating layer 495 and the second optical filter 532. The intermediate layer 497 may be formed on the lower surface of the first protective insulating layer 495 to cover the third optical filter 533. For example, the intermediate layer 497 may have a relatively thick thickness to sufficiently cover the third optical filter 533 on the lower surface of the first protective insulating layer 495. The intermediate layer 497 may be formed by using an organic insulating material, an inorganic insulating material, or the like.

Accordingly, an upper structure 600 including the second protective insulating layer 490, the first protective insulating layer 495, the optical filters 530, the intermediate layer 497, the color filters 510, the light blocking member 420, and the second substrate 410 may be provided.

A sealing member may be formed in the peripheral region 20 on the first substrate 110. Alternatively, the sealing member may be formed in the peripheral region 20 on the second substrate 410. The sealing member may be formed by using a non-conductive material. For example, the sealing member may include a frit or the like. In addition, the sealing member may additionally include a photocurable material. For example, the sealing member may include a mixture of an organic material and a photocurable material. The photocurable material included in the sealing member may include an epoxy acrylate-based resin, a polyester acrylate-based resin, a urethane acrylate-based resin, a polybutadiene acrylate-based resin, a silicon acrylate-based resin, an alkyl acrylate-based resin, and the like.

Figure 20:
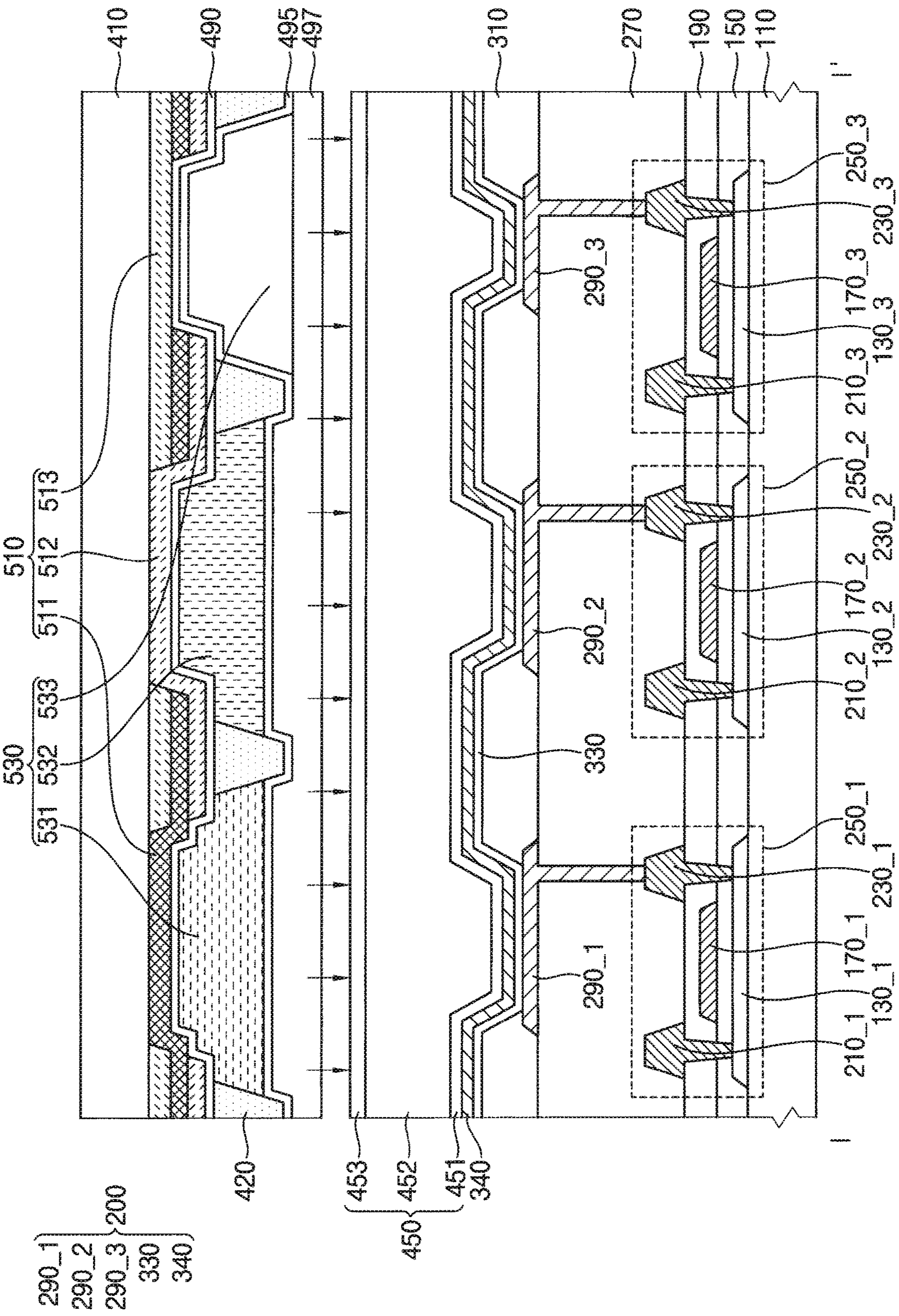

Referring to FIGS. 8 and 20, after the sealing member is formed, the lower surface of the second substrate 410 may be in contact with the sealing member. In this case, the lower structure 500 and the upper structure 600 may be coupled to each other.

Then, ultraviolet rays, laser light, visible light, or the like may be irradiated onto the sealing member. For example, the laser light may be irradiated onto the sealing member. As the laser light is irradiated, the mixture may be changed from a solid state to a liquid state, and the mixture in the liquid state may be cured into the solid state after a predetermined time. The second substrate 410 may be coupled to the first substrate 110 while being sealed with respect to the first substrate 110 according to the state change of the mixture.

Accordingly, the display device 100 illustrated in FIGS. 1 to 8 may be manufactured.

In a method of manufacturing the display device according to the embodiments of the present inventive concept, as each of the first to third openings 420*a*, 420*b*, and 420*c* of the light blocking member 420 has a plan shape of a square rotated about 45 degrees, an impact section of an ink may be relatively long. Accordingly, the inkjet process may be simultaneously performed in the mother substrate including the second substrates of different sizes, and a time of the inkjet process may be significantly reduced due to a relatively long impact section of an ink, e.g., 294 seconds/mother substrate.

In addition, each of the first to third openings 420*a*, 420*b*, and 420*c* has chamfered corners, so that the ink may be easily filled at the corners. Accordingly, the display device 100 may prevent a defect in which the ink is not filled at the corners.

Figure 21:
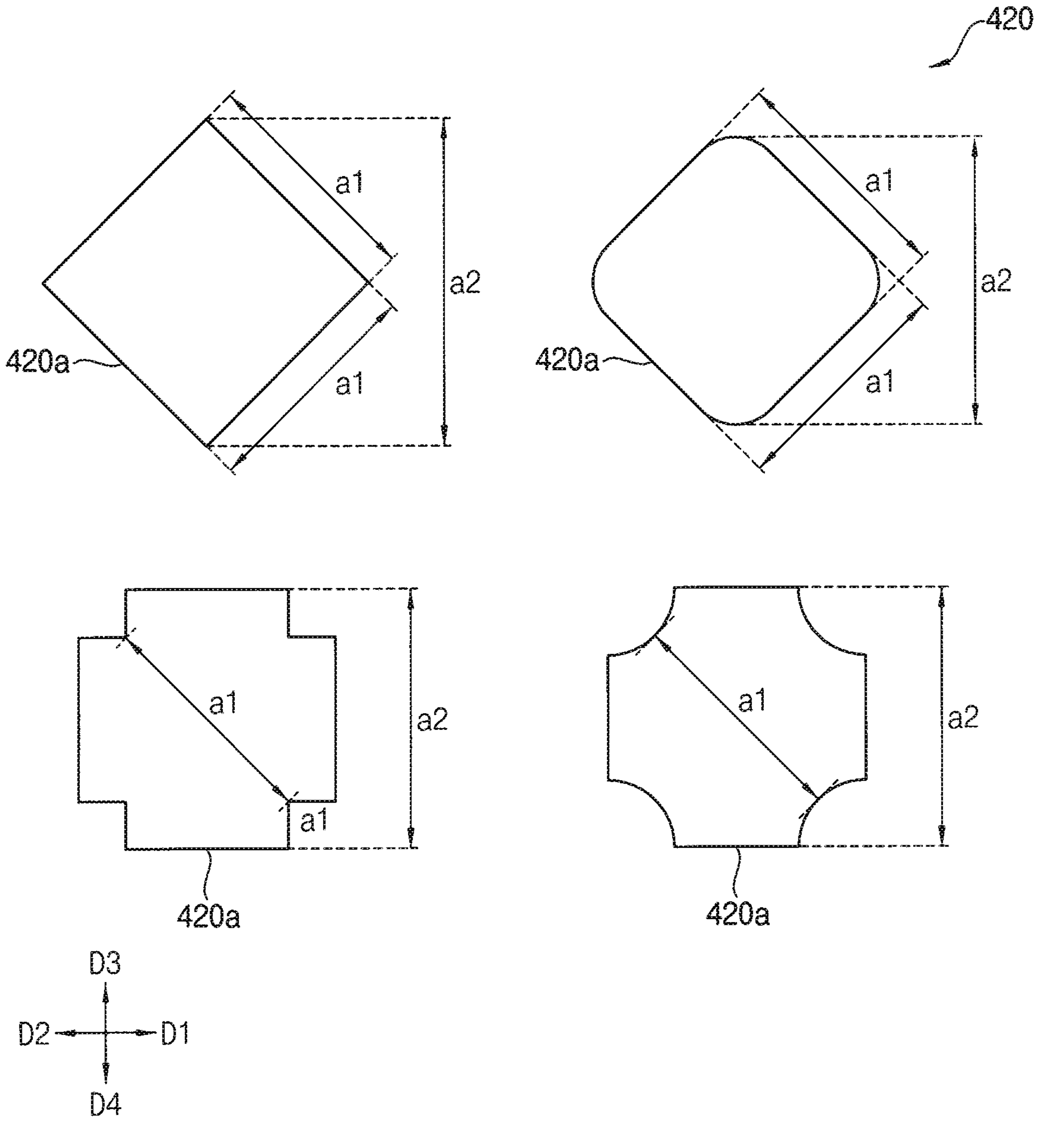
FIG. 21 is a plan view illustrating an example of a shape of an opening of the light blocking member of FIG. 5.

FIG. 21 is a plan view illustrating an example of a shape of an opening of the light blocking member of FIG. 5. For example, shapes of four openings are illustrated in FIG. 21.

Referring to FIG. 21, an opening illustrated in first row and first column may have a plan shape of a square rotated by about 45 degrees. In other words, each of first to third openings 420*a*, 420*b*, and 420*c* of a light blocking member 420 may not have a chamfered corner.

An opening illustrated in first row and second column may have a plan shape of a square having a rounded corner. In other words, each of first to third openings 420*a*, 420*b*, and 420*c* of a light blocking member 420 may have a rounded corner, and may have a plan shape of a square rotated by about 45 degrees.

Each of an opening illustrated in second row and first column and an opening illustrated in second row and second row, the second column may have an isotropic shape. In other words, each of first to third openings 420*a*, 420*b*, 420*c* of a light blocking member 420 may have an isotropic shape, and a long axis of each of the first to third openings 420*a*, 420*b*, 420*c* may be parallel to a column direction or a row direction of pixel regions 30.

Figure 22:
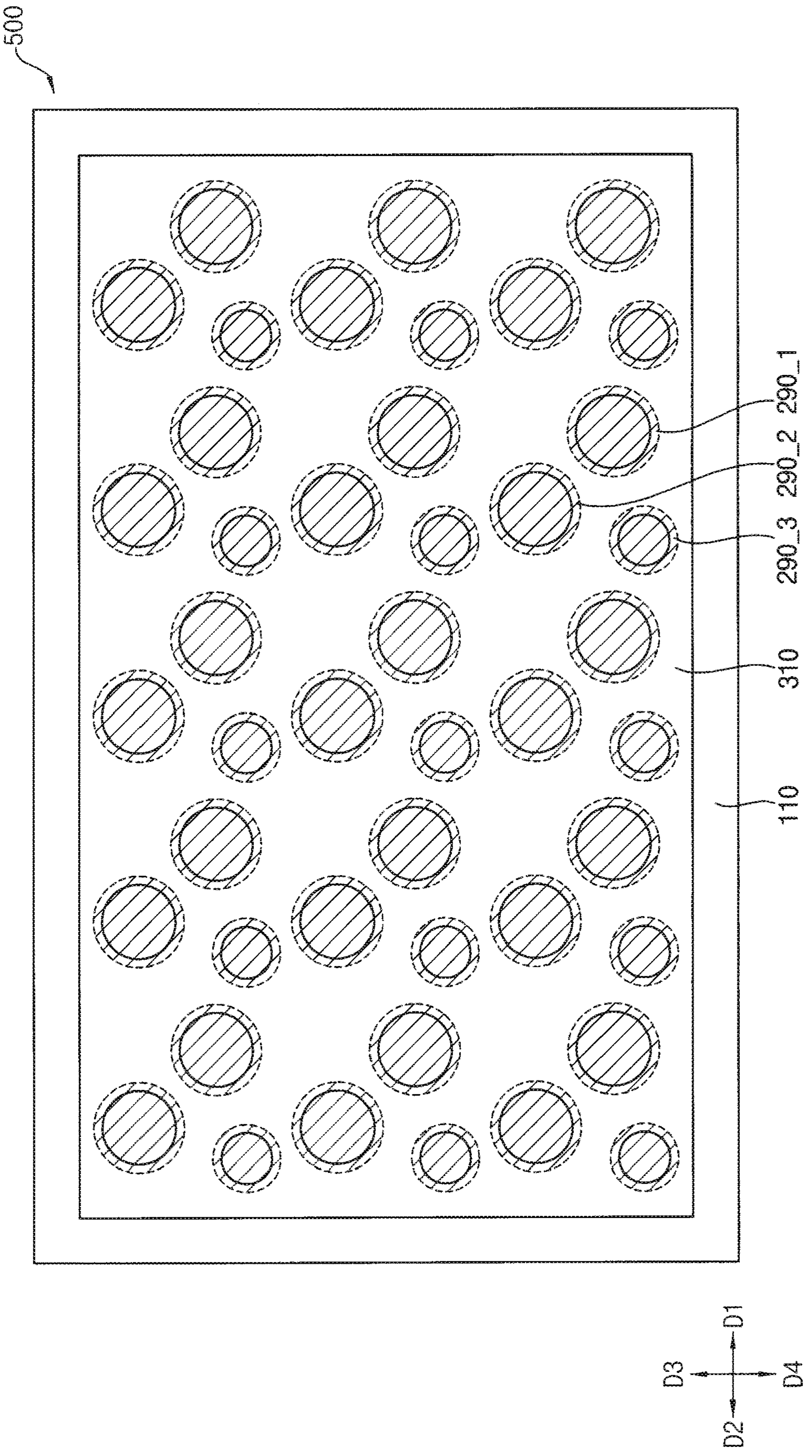
FIG. 22 is a plan view illustrating an example of a shape where the pixel defining layer and the lower electrode of FIG. 4 overlap each other.
Figure 23:
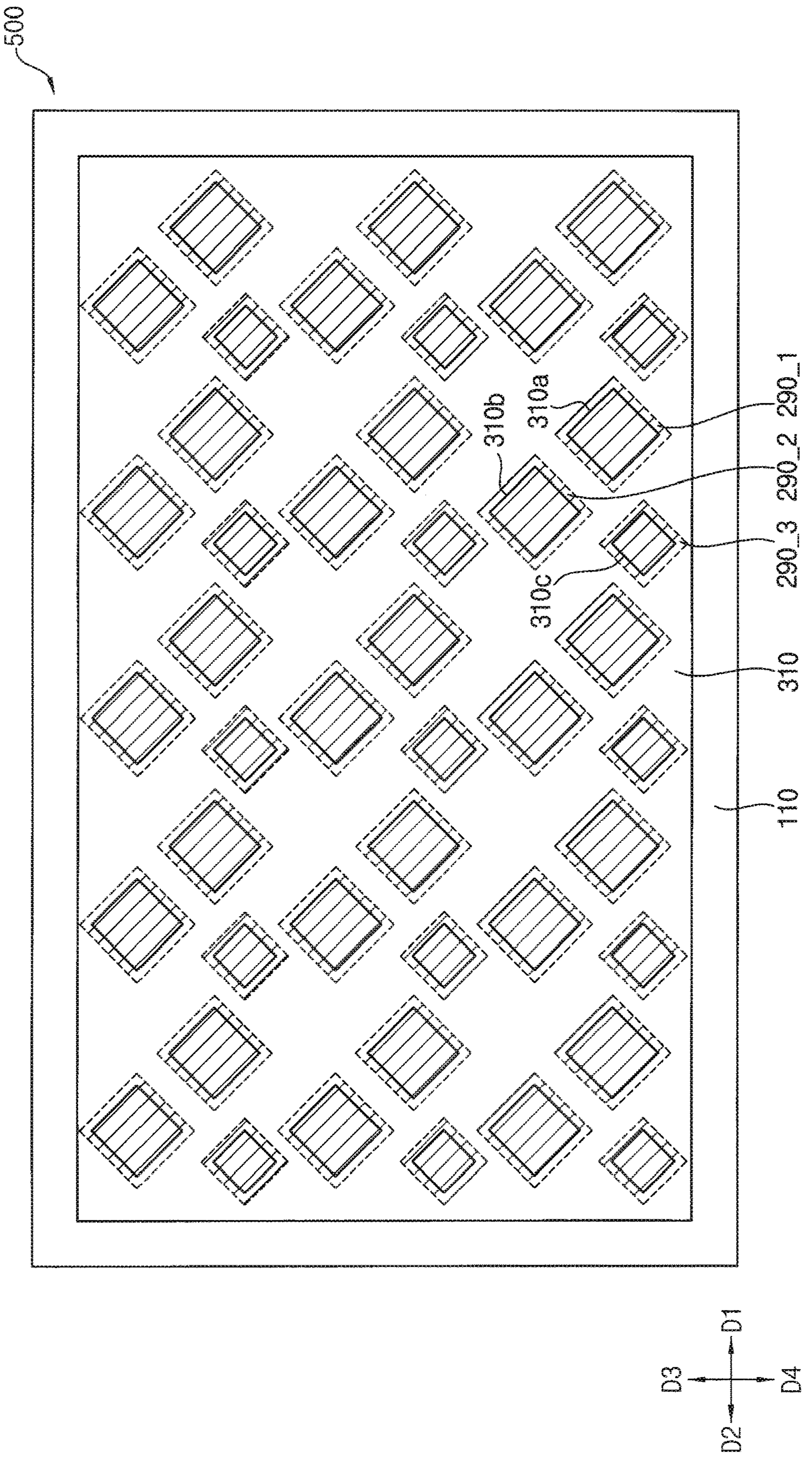
FIG. 23 is a plan view illustrating another example of a shape where the pixel defining layer and the lower electrode of FIG. 4 overlap each other.

FIG. 22 is a plan view illustrating an example of a shape where the pixel defining layer and the lower electrode of FIG. 4 overlap each other. FIG. 23 is a plan view illustrating another example of a shape where the pixel defining layer and the lower electrode of FIG. 4 overlap each other.

Referring to FIG. 22, when viewed in a plan view of a display device 100, each of first to third openings 310*a*, 310*b*, and 310*c* of a pixel defining layer 310 may have a plan shape of a circle, and each of first to third lower electrodes 290_1, 290_2, and 290_3 may have a plan shape of a circle.

Referring to FIG. 23, when viewed in a plan view of a display device 100, each of first to third openings 310*a*, 310*b*, and 310*c* of a pixel defining layer 310 may have a plan shape of a square rotated by about 45 degrees, and each of first to third lower electrodes 290_1, 290_2, and 290_3 may have a shape of a square rotated by about 45 degrees.

Figure 24:
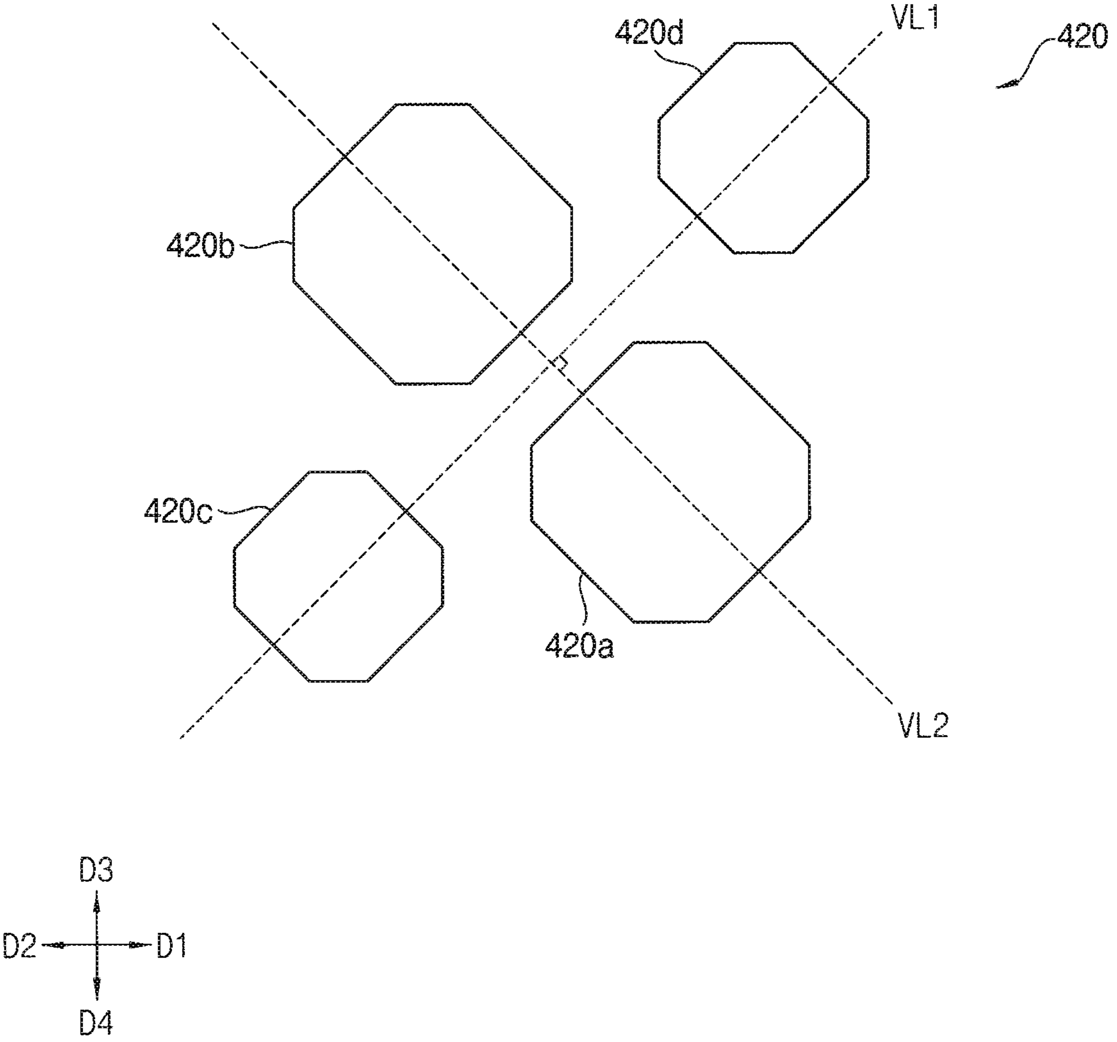
FIG. 24 is a plan view illustrating an example of the light blocking member of FIG. 5.

FIG. 24 is a plan view illustrating an example of the light blocking member of FIG. 5.

Referring to FIG. 24, a fourth opening 420*d* which is symmetrical with a third opening 420*c* based on a second virtual line VL2 may be positioned on a first virtual line VL1 to overlap the first virtual line VL1. In other words, a light blocking member 420 may include first to fourth openings 420*a*, 420*b*, 420*c*, and 420*d*. In this case, each of the pixel regions 30 may include first to fourth sub-pixel regions.

Figure 25:
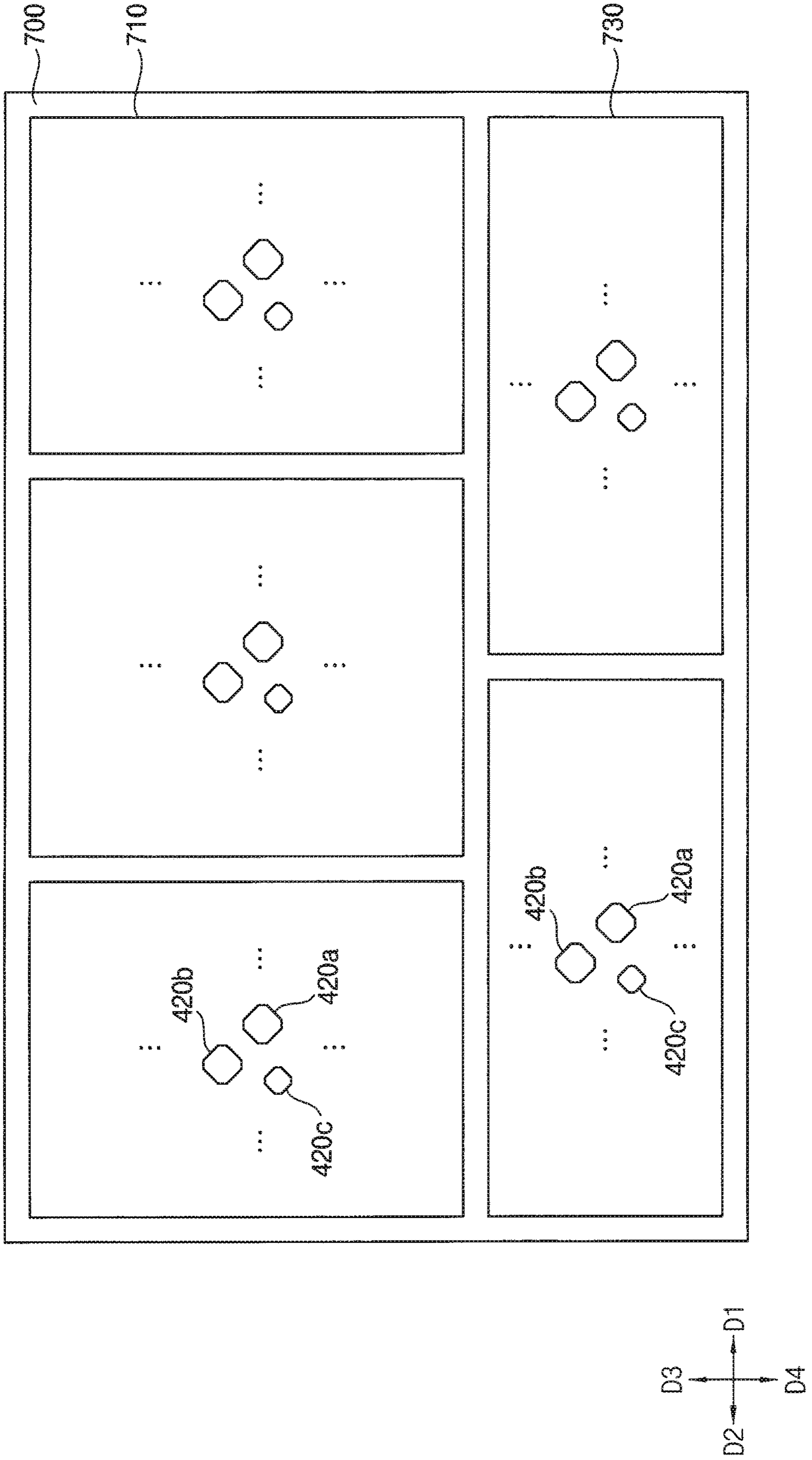
FIG. 25 is a plan view illustrating a mother substrate including second substrates that have different sizes from each other.

FIG. 25 is a plan view illustrating a mother substrate including second substrates that have different sizes from each other. FIG. 26 is a plan view illustrating an example of the mother substrate of FIG. 25. FIG. 27 is a plan view illustrating another example of the mother substrate of FIG. 25.

Referring to FIGS. 25, 26, and 27, a mother substrate 700 may include upper and lower substrates 710 and 730 having different sizes to each other. After a second protective insulating layer 490, a first protective insulating layer 495, optical filters 530, an intermediate layer 497, color filters 510, and a light blocking member 420 (see FIG. 8 for example) are formed on the original substrate 700, the upper structures 600 may be provided by cutting each of the upper and lower substrates 710 and 730. In other words, the mother substrate 700 may correspond to the second substrate 410 of the upper structure 600.

Referring to FIG. 25, each of first to third openings 420*a*, 420*b*, and 420*c* of a light blocking member 420 included in each of the upper and lower substrates 710 and 730 may have a chamfered corner, and may have a plan shape of a square rotated at a predetermined angle, e.g., about 45 degrees. In this case, since the first to third openings 420*a*, 420*b*, and 420*c* have an isotropic shape, an ink in an inkjet process may be applied to the first to third openings 420*a*, 420*b*, and 420*c* at once in a first direction D1 (or a second direction D2) or a third direction D3 (or a fourth direction D4). In addition, since the first to third openings 420*a*, 420*b*, and 420*c* has a relatively long ink impact section, a time of the inkjet process may be significantly reduced.

Referring to FIG. 26, first to third openings 420*a*, 420*b*, and 420*c* included in an upper substrate 710 may have an isotropic shape, and first to third openings 420*a*, 420*b*, and 420*c* included in a lower substrate 730 may have a tetragonal shape, e.g., a long axis parallel to a third direction D3 or a fourth direction D4. In this case, an ink in an inkjet process may be applied to the first to third openings 420*a*, 420*b*, and 420*c* at once in the third direction D3 (or the fourth direction D4).

Referring to FIG. 27, first to third openings 420*a*, 420*b*, and 420*c* included in the lower substrate 730 may have an isotropic shape, and first to third openings 420*a*, 420*b*, and 420*c* included in the upper substrate 710 may have a tetragonal shape, e.g., a long axis parallel to a first direction D1 or a second direction D2. In this case, an ink in an inkjet process may be applied to the first to third openings 420*a*, 420*b*, and 420*c* at once in the first direction D1 (or the second direction D2).

FIG. 28 is a plan view illustrating a comparative example of the mother substrate of FIGS. 25, 26, and 27. For example, FIG. 28 is a plan view illustrating a conventional mother substrate.

Referring to FIG. 28, a mother substrate 1000 may include upper and lower substrates 710 and 730 having different sizes to each other.

First to third openings 420*a*, 420*b*, and 420*c* included in an upper substrate 710 may have a tetragonal shape, e.g., a long axis parallel to a first direction D1 or a second direction D2, and first to third openings 420*a*, 420*b*, and 420*c* included in a lower substrate 730 may have a tetragonal shape, e.g., a long axis parallel to a third direction D3 or a fourth direction D4.

In this case, after an ink in an inkjet process is applied to the first to third openings 420*a*, 420*b*, and 420*c* of the upper substrate 710 in the first direction D1 (or the second direction D2), an ink may be applied to the first to third openings 420*a*, 420*b*, and 420*c* of the lower substrate 730 in the third direction D3 (or the fourth direction D4). In this case, the inkjet process may take a long time.

The present inventive concept may be applied to various electronic devices including a display device. For example, the present inventive concept may be applied to numerous electronic devices such as vehicle-display devices, ship-display devices, aircraft-display devices, portable communication devices, exhibition display devices, information transfer display devices, medical-display devices, etc.

The foregoing is illustrative of embodiments and is not to be construed as limiting thereof. Although a few embodiments have been described, those skilled in the art will readily appreciate that many modifications are possible in the embodiments without materially departing from the novel teachings and advantages of the present inventive concept. Accordingly, all such modifications are intended to be included within the scope of the present inventive concept as defined in the claims. Therefore, it is to be understood that the foregoing is illustrative of various embodiments and is not to be construed as limited to the specific embodiments disclosed, and that modifications to the disclosed embodiments, as well as other embodiments, are intended to be included within the scope of the appended claims.

What is claimed is:

1. A display device comprising:

a first substrate having a plurality of pixel regions each including a first sub-pixel region, a second sub-pixel region, and a third sub-pixel region;

pixel structures disposed on the first substrate including in the first sub-pixel region, the second sub-pixel region, and the third sub-pixel region; and first, second, and third optical filters disposed to overlap the first, second, and third sub-pixel regions, respectively, on the pixel structures, wherein:

each of the first, second, and third optical filters has a square shape;

a long axis extending between opposite corners of the square is parallel to row or column directions of the pixel regions, the row direction being perpendicular to the column direction;

the third optical filter overlaps a first virtual line located between a first side of the first optical filter and a first side of the second optical filter, the first side of the second optical filter being adjacent to the first side of the first optical filter;

the first virtual line extends parallel to the first sides of the first and second optical filters and angled to the row and column directions of the pixel regions;

a second virtual line is perpendicular to the first virtual line wherein the second virtual line connects points that correspond to half of the first side of the first optical filter and half of the first side of the second optical filter; and a width of the first optical filter is substantially equal to a width of the second optical filter, and a width of the third optical filter is less than the width of the first optical filter and the width of the second optical filter, wherein the third optical filter is configured to emit a blue color of light, and the third optical filter includes a scattering material, and the first optical filter and second optical filter include quantum dots.

2. The display device of claim 1, wherein the first virtual line connects points that correspond to half of each of first and second sides of the third optical filter.

3. The display device of claim 1, wherein, a distance of each of sides of the square is a same on a plane of the display device.

4. The display device of claim 1, further comprising:

a light blocking member disposed on the pixel structure, the light blocking member including a first opening overlapping the first sub-pixel region, a second opening overlapping the second sub-pixel region, and a third opening overlapping the third sub-pixel region.

5. The display device of claim 4, wherein:

the first optical filter is disposed in the first opening;

the second optical filter is disposed in the second opening; and the third optical filter is disposed in the third opening.

6. The display device of claim 5, wherein:

a shape of the first optical filter is identical to a shape of the first opening on a plane of the display device;

a shape of the second optical filter is identical to a shape of the second opening on the plane of the display device; and a shape of the third optical filter is identical to a shape of the third opening on the plane of the display device.

7. The display device of claim 1, wherein:

the third optical filter transmits a first color of light;

the first optical filter converts the first color of light to a second color of light; and the second optical filter converts the first color of light to a third color of light.

8. The display device of claim 7, wherein the pixel structure emits the first color of light.

9. The display device of claim 1, further comprising:

a second substrate disposed on the first, second, and third optical filters;

a first color filter disposed between the second substrate and the first optical filter;

a second color filter disposed between the second substrate and the second optical filter; and a third color filter disposed between the second substrate and the third optical filter.

10. The display device of claim 9, wherein:

the third color filter overlaps the third optical filter on a lower surface of the second substrate;

the third color filter includes a first opening and a second opening;

the first opening overlaps a portion where the first optical filter is disposed; and the second opening overlaps a portion where the second optical filter is disposed.

11. The display device of claim 10, wherein:

the first color filter is disposed in the first opening of the third color filter;

the first color filter includes a third opening and a fourth opening;

the third opening exposes the second opening; and the fourth opening overlaps a portion where the third optical filter is disposed under the third color filter.

12. The display device of claim 11, wherein:

the second color filter is disposed in the second and third opening;

the second color filter includes a fifth opening and a sixth opening;

the fifth opening exposes a part of the first color filter; and the sixth opening overlaps the fourth opening.

13. The display device of claim 11, wherein the pixel structure includes:

a first lower electrode disposed under the first optical filter;

a second lower electrode disposed under the second optical filter;

a third lower electrode disposed under the third optical filter;

a light emitting layer disposed on the first, second, and third lower electrodes; and an upper electrode disposed on the light emitting layer, and wherein a shape of each of the first, second, and third lower electrodes corresponds to a shape of each of the first, second, and third optical filters.

14. A display device comprising:

a first substrate having a plurality of pixel regions each including a first sub-pixel region, a second sub-pixel region, and a third sub-pixel region;

pixel structures disposed on the first substrate including in the first sub-pixel region, the second sub-pixel region, and the third sub-pixel region; and first, second, and third optical filters disposed to overlap the first, second, and third sub-pixel regions, respectively, on the pixel structures, wherein:

each of the first, second, and third optical filters has a square shape in which each of corners is chamfered;

each of the first, second, and third optical filters is rotated at a predetermined angle based on a center of the square such that a long axis extending between opposite chamfered corners of the square is parallel to row or column directions of the pixel regions, the row direction being perpendicular to the column direction;

the third optical filter overlaps a first virtual line located between a first side of the first optical filter and a first side of the second optical filter, the first side of the second optical filter being adjacent to the first side of the first optical filter;

the first virtual line extends parallel to the first sides of the first and second optical filters and angled to the row and column directions of the pixel regions;

a second virtual line is perpendicular to the first virtual line wherein the second virtual line connects points that correspond to half of the first side of the first optical filter and half of the first side of the second optical filter; and a width of the first optical filter is substantially equal to a width of the second optical filter, and a width of the third optical filter is less than the width of the first optical filter and the width of the second optical filter, wherein the third optical filter is configured to emit a blue color of light, and the third optical filter includes a scattering material, and the first optical filter and second optical filter include quantum dots.

15. The display device of claim 14, wherein an angle between the chamfered corner and a side of the square is an obtuse angle.

16. The display device of claim 14, wherein a distance between chamfered corners, which are opposite to each other, among the chamfered corners is greater than a distance between sides of the square, which are opposite to each other, among the sides of the square.

17. The display device of claim 14, wherein each of corners of the first, second, and third optical filters has a rounded tetragon shape.

18. The display device of claim 14, wherein the predetermined angle is about 45 degrees.

19. The display device of claim 14, further comprising:

a light blocking member disposed on the pixel structure, the light blocking member including a first opening overlapping the first sub-pixel region, a second opening overlapping the second sub-pixel region, and a third opening overlapping the third sub-pixel region, wherein:

the first optical filter is disposed in the first opening;

the second optical filter is disposed in the second opening;

the third optical filter is disposed in the third opening;

a shape of the first optical filter is identical to a shape of the first opening on a plane of the display device;

a shape of the second optical filter is identical to a shape of the second opening on the plane of the display device; and a shape of the third optical filter is identical to a shape of the third opening on the plane of the display device.

* * * * *